July 8, 1930. J. F. PETERS 1,770,041
ROLL BODYMAKER
Filed Nov. 2, 1927 15 Sheets-Sheet 9
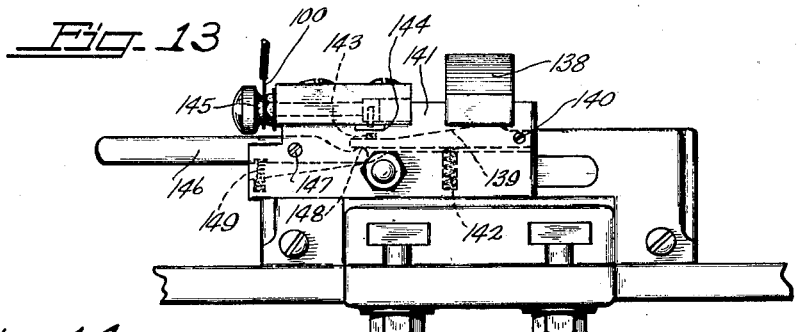
Fig. 13
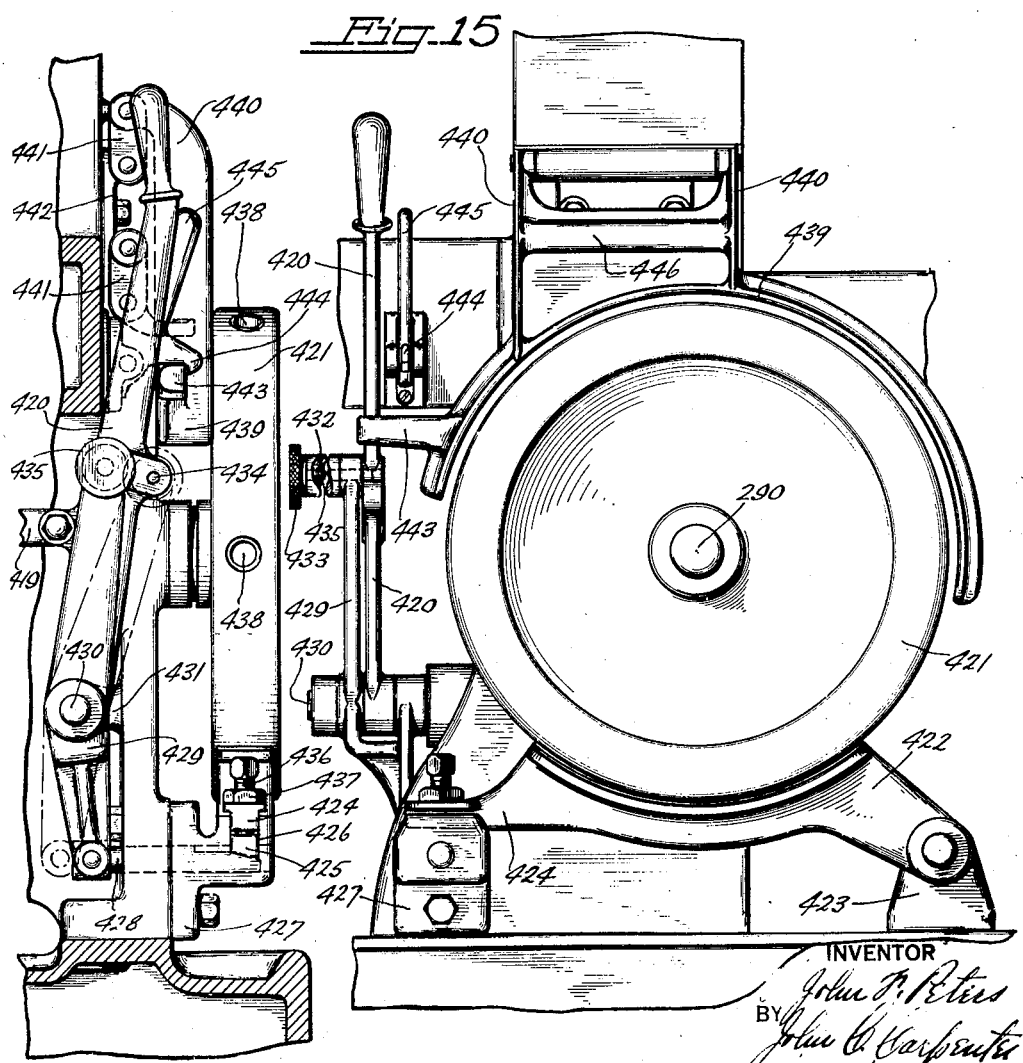
Fig. 14
Fig. 15
INVENTOR
John F. Peters
BY
John C. Carpenter
ATTORNEY July 8, 1930.  J. F. PETERS  1,770,041
ROLL BODYMAKER
Filed Nov. 2, 1927    15 Sheets-Sheet 10

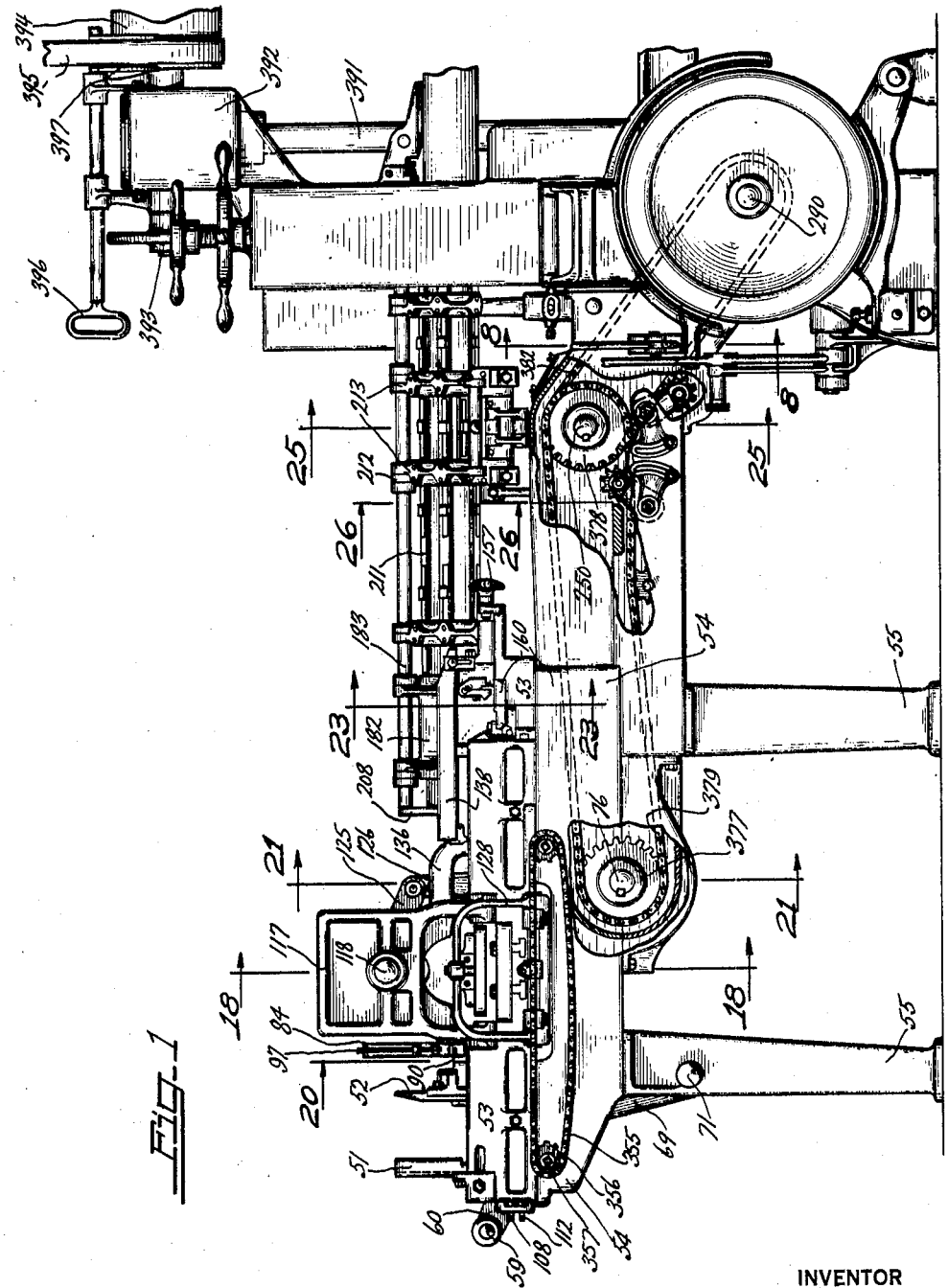

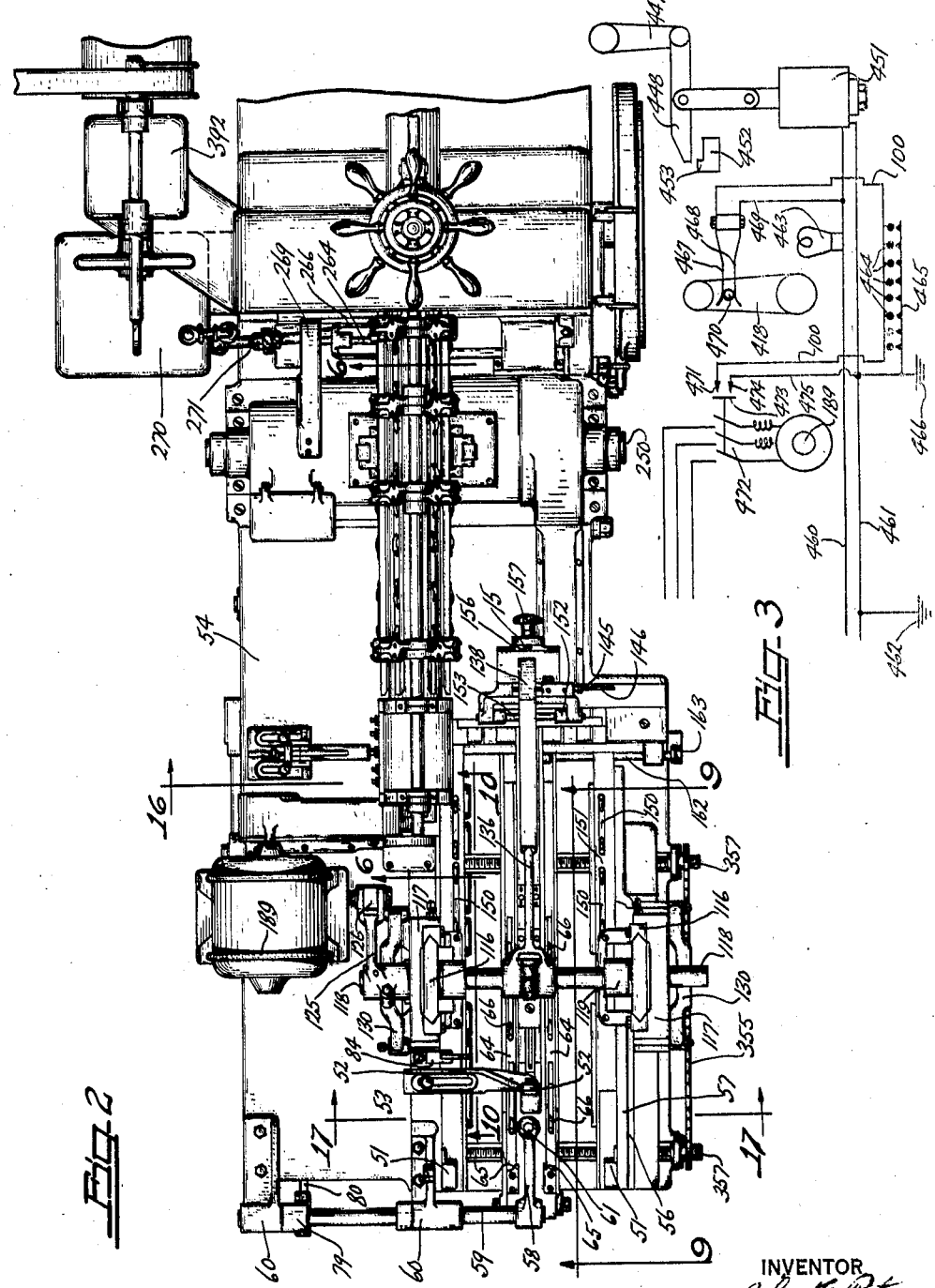

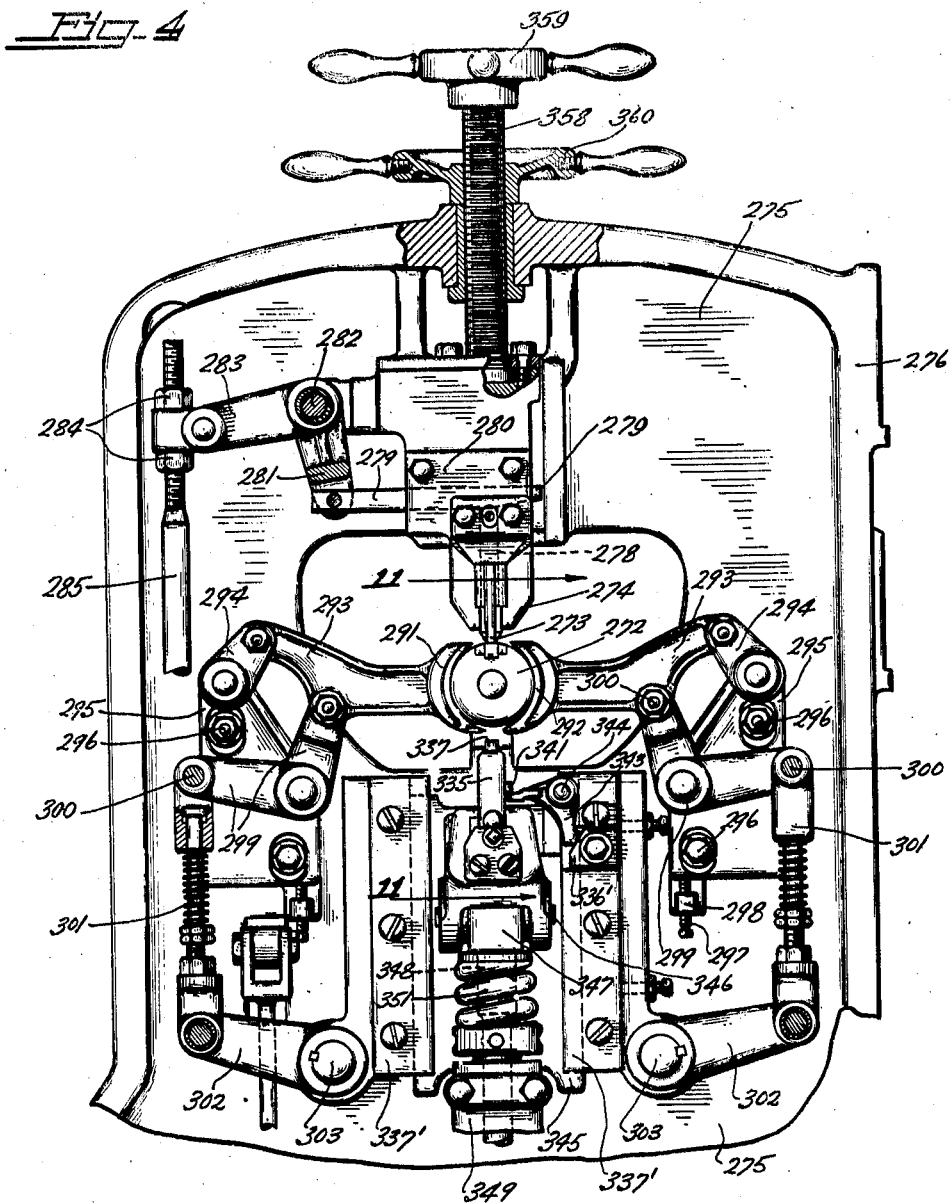

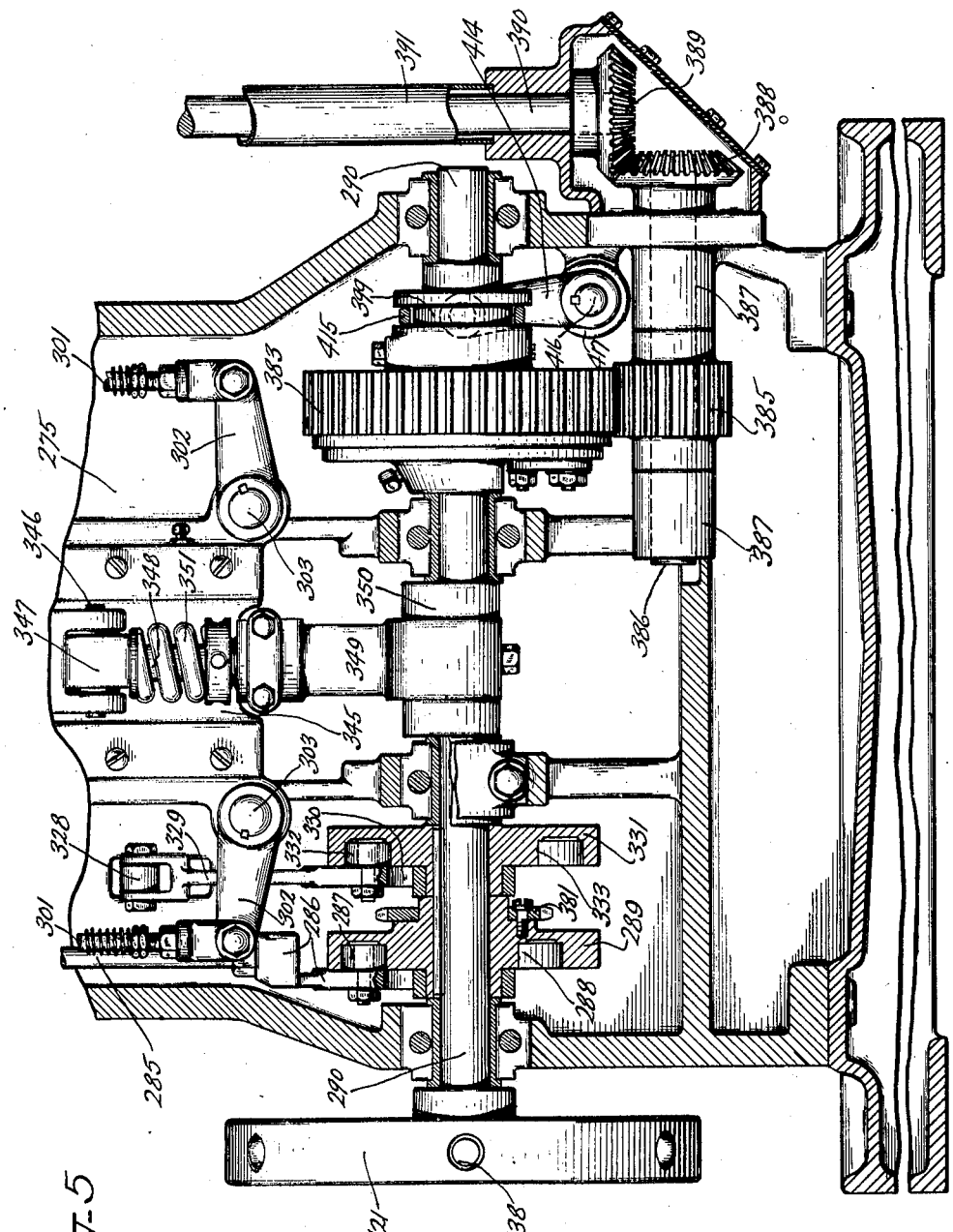

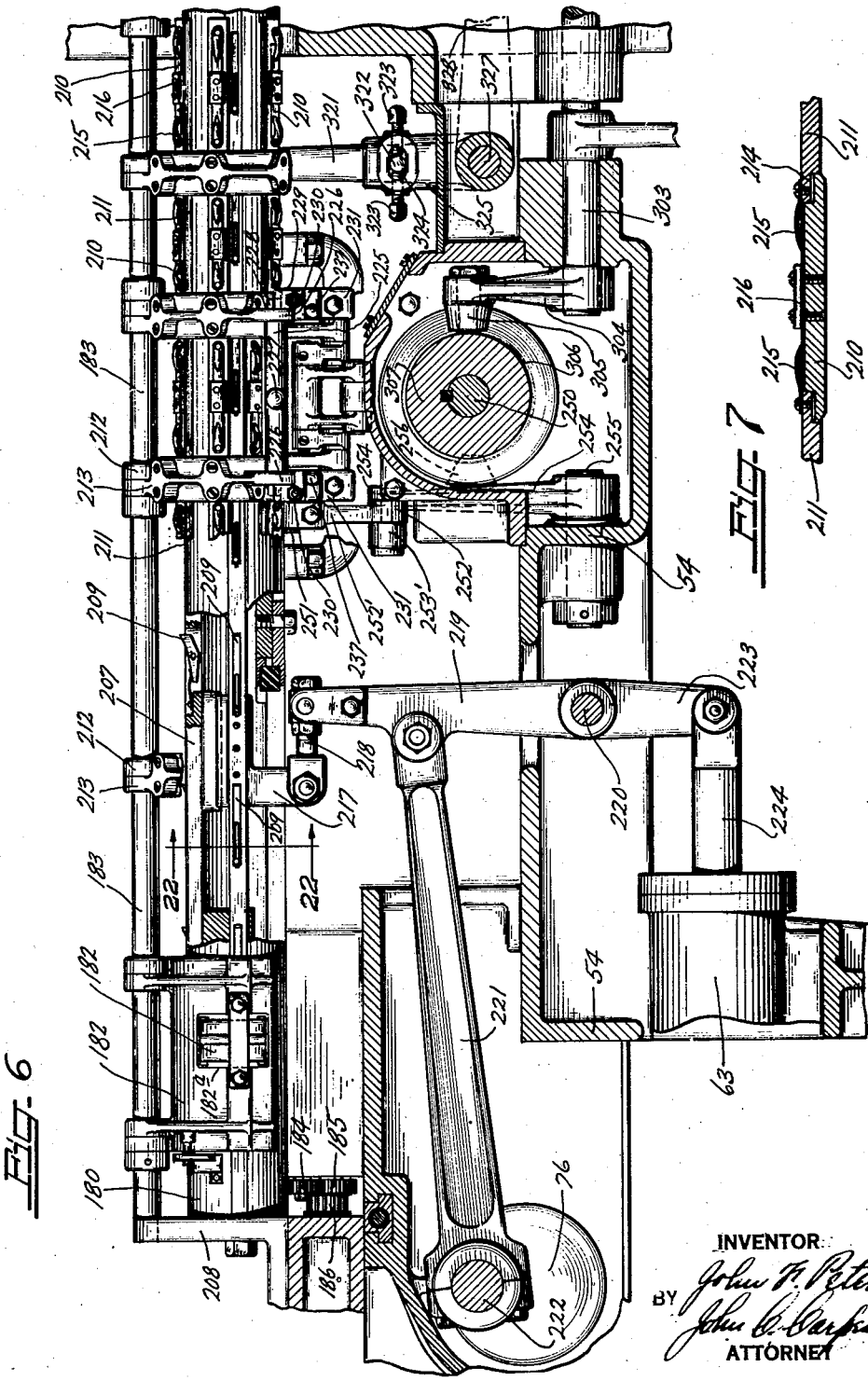

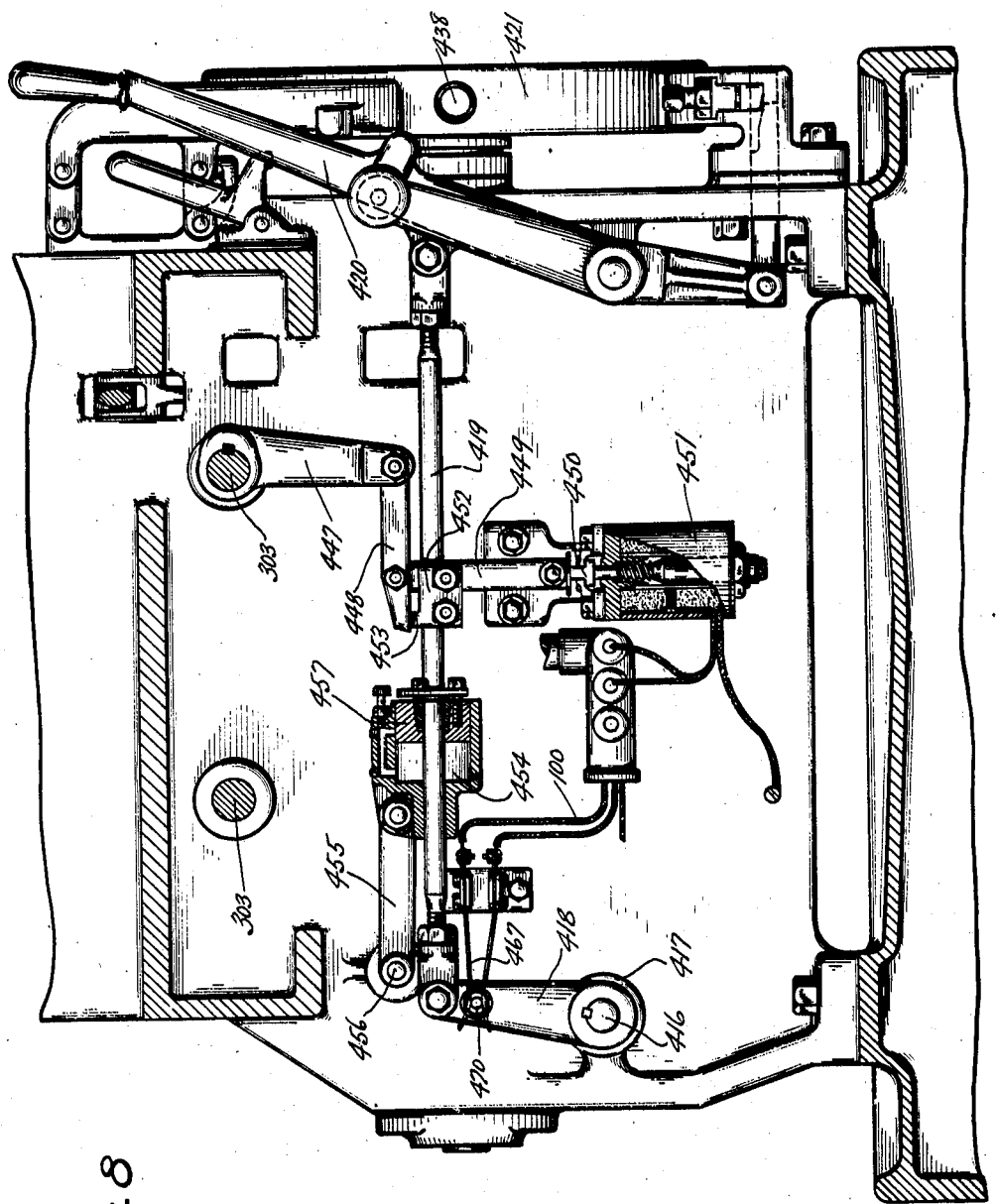

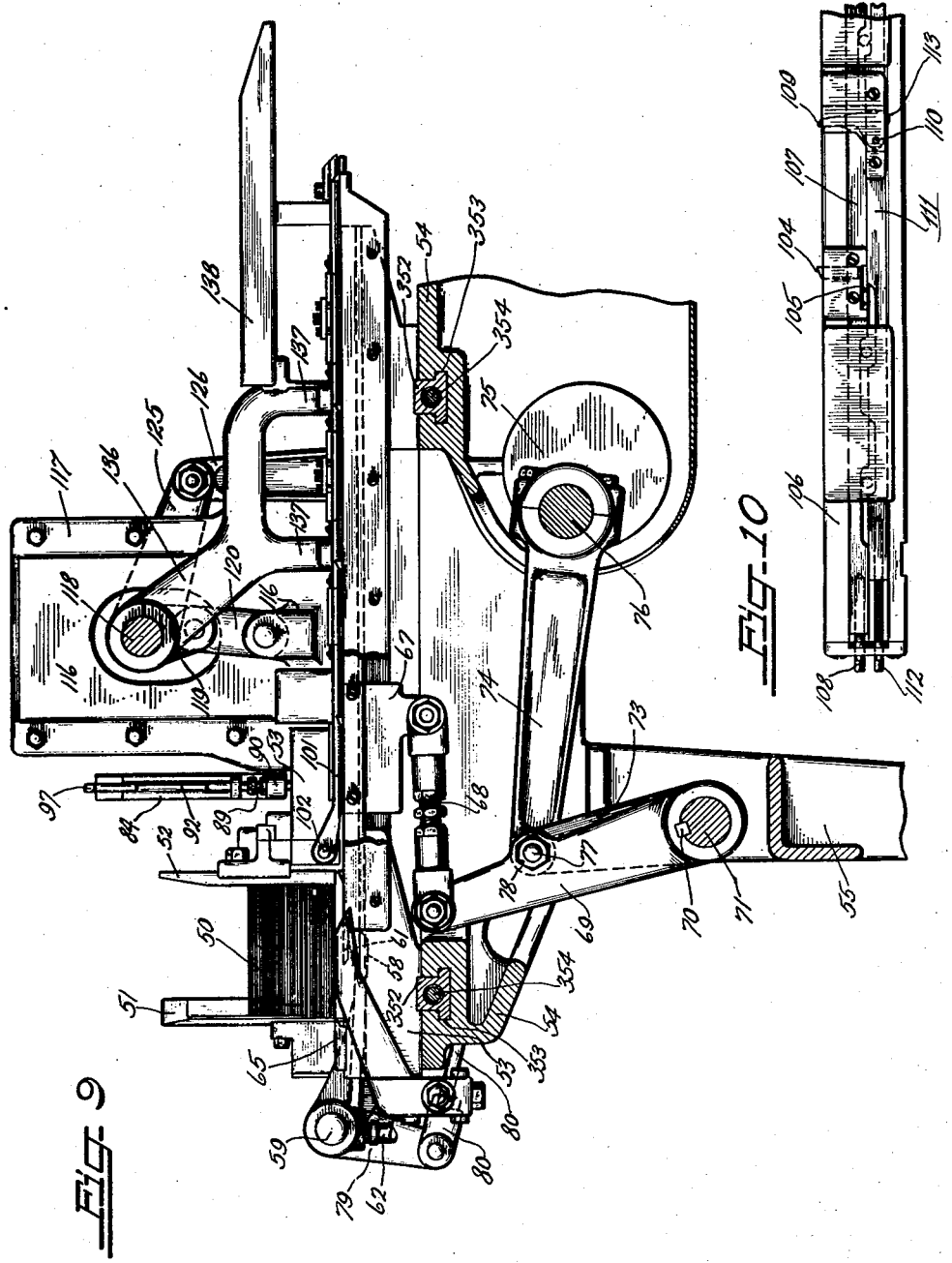

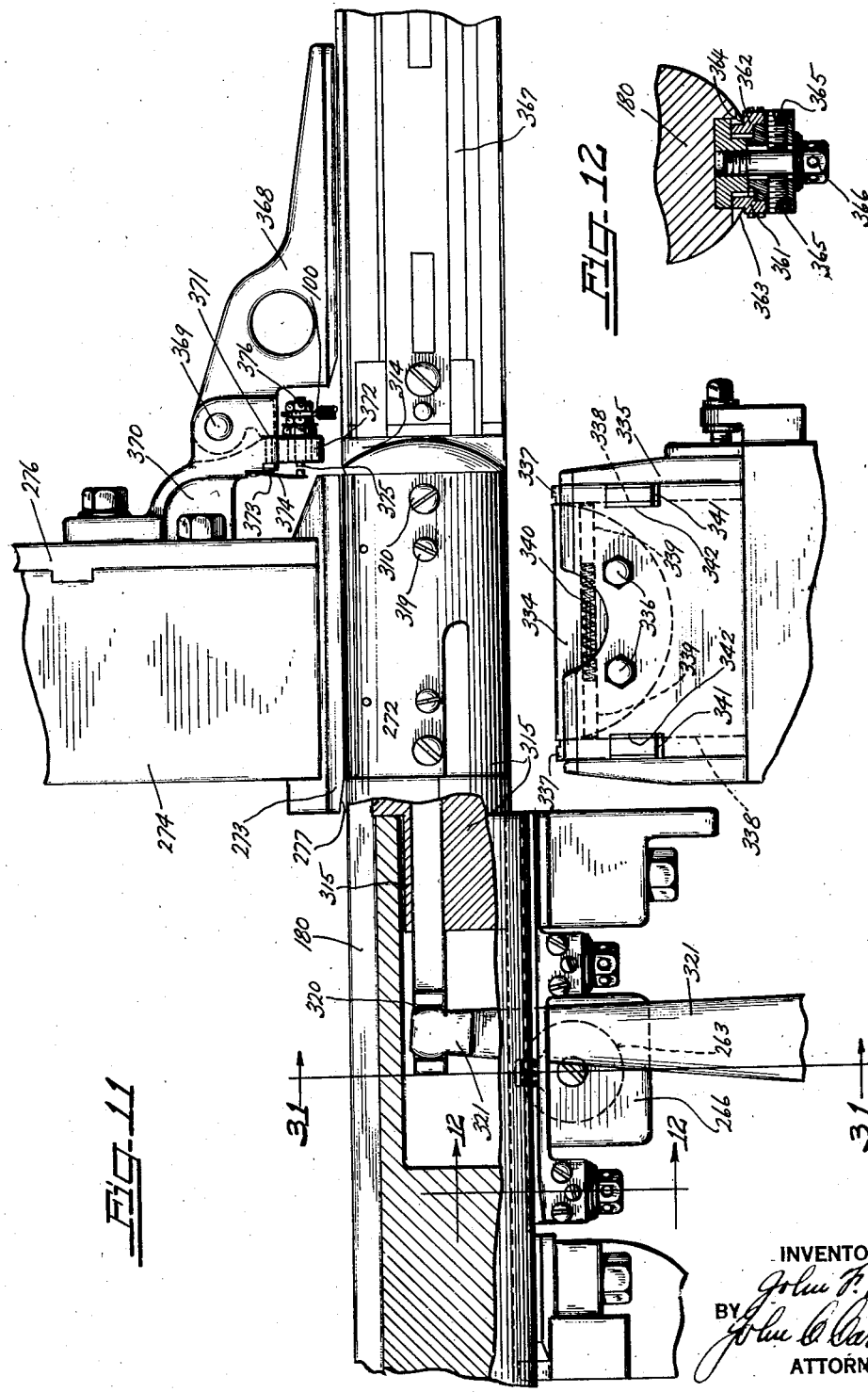

INVENTOR
John F. Peters
BY John C. Carpenter
ATTORNEY

July 8, 1930.  J. F. PETERS  1,770,041
ROLL BODYMAKER
Filed Nov. 2, 1927   15 Sheets-Sheet 11

INVENTOR
John F. Peters
BY John C. Carpenter
ATTORNEY

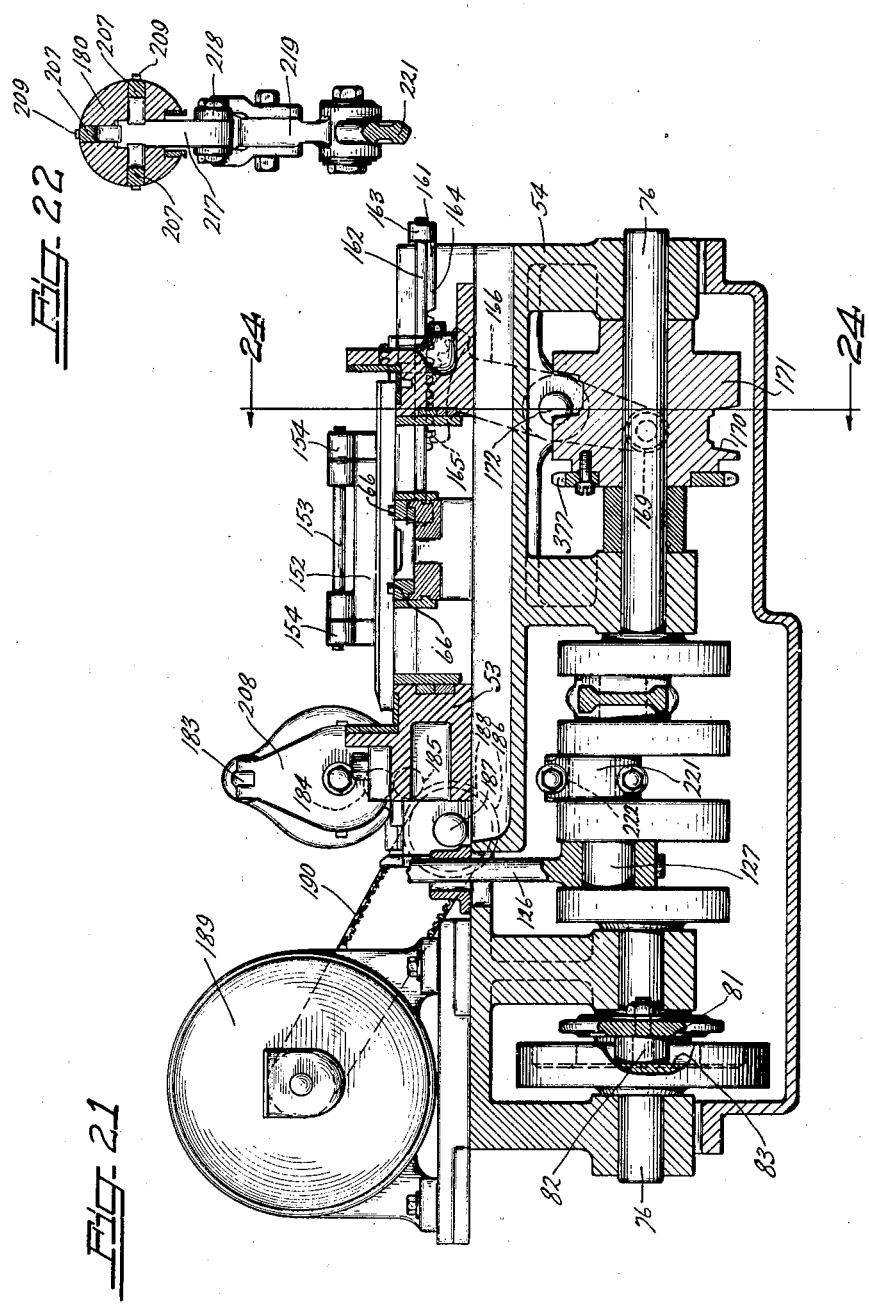

July 8, 1930.  J. F. PETERS  1,770,041
ROLL BODYMAKER
Filed Nov. 2, 1927    15 Sheets-Sheet 13

INVENTOR
John F. Peters
BY John C. Carpmael
ATTORNEY

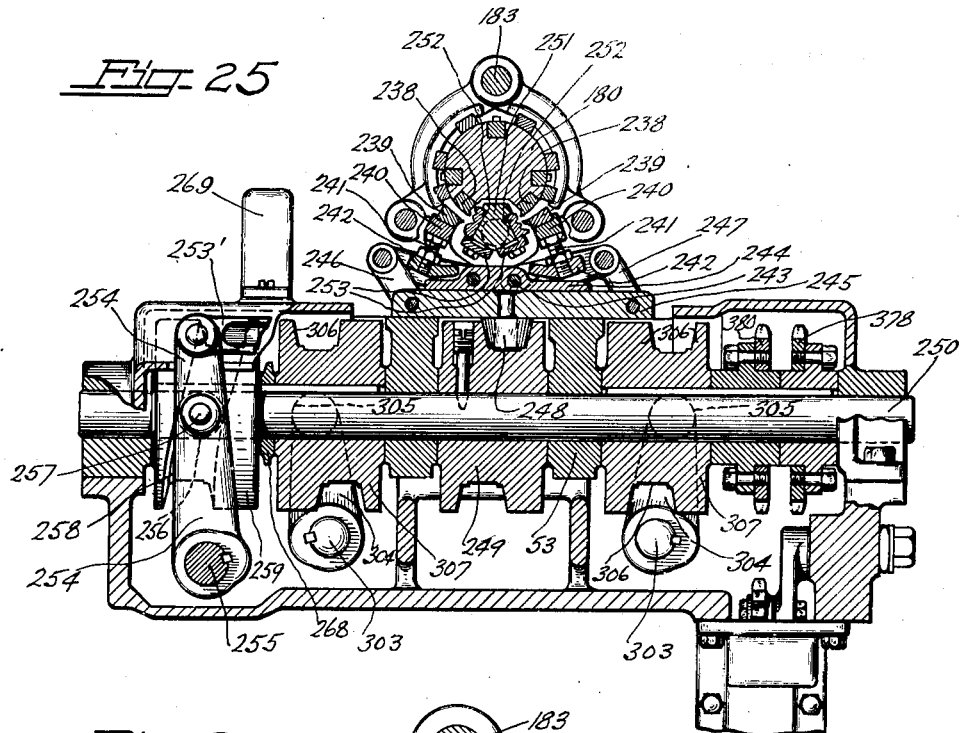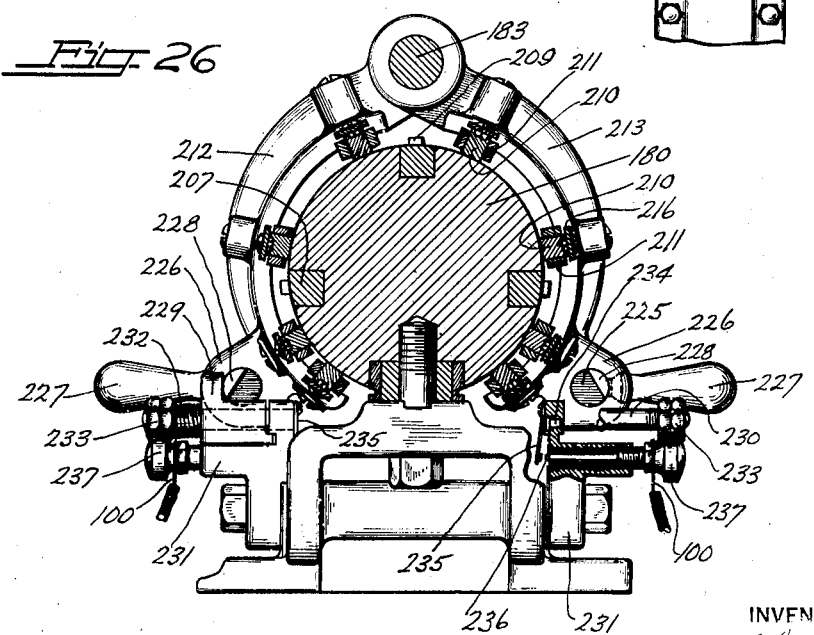

July 8, 1930. J. F. PETERS 1,770,041
ROLL BODYMAKER
Filed Nov. 2, 1927 15 Sheets-Sheet 15
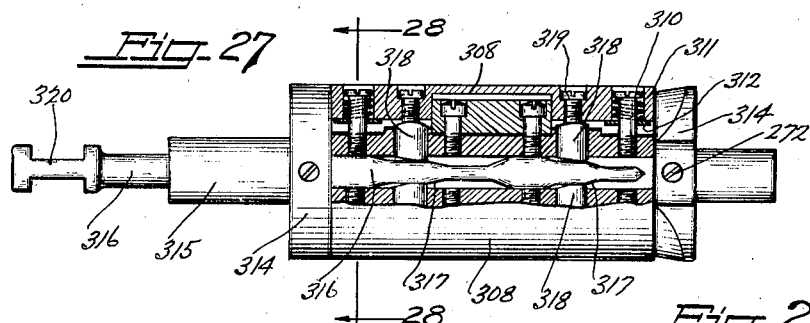
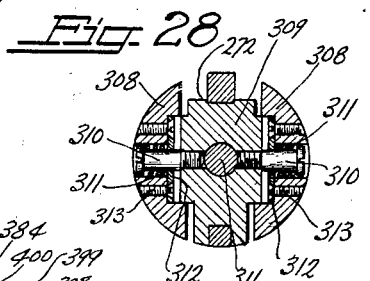
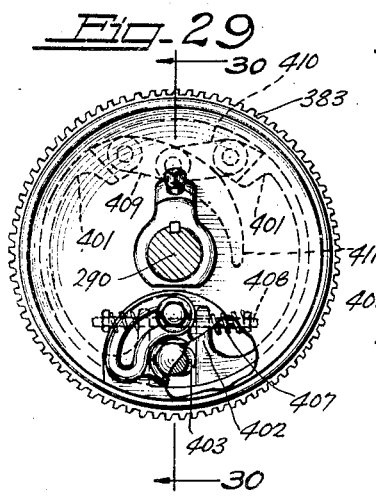
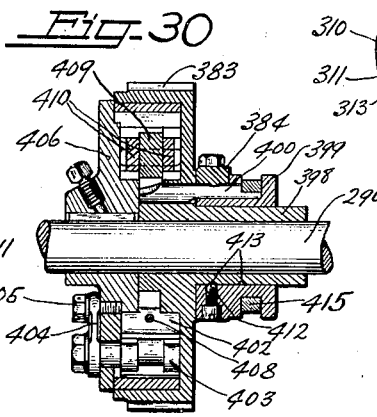
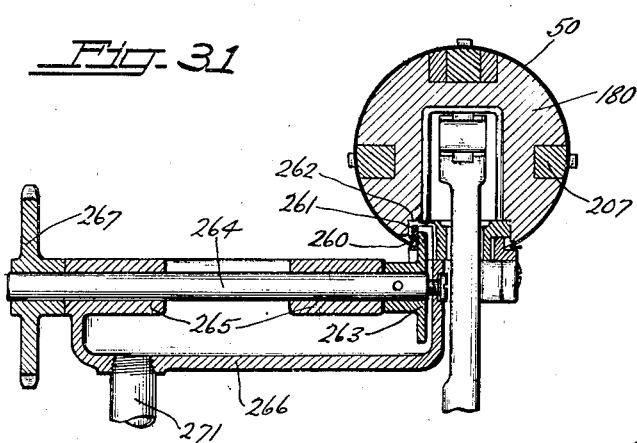
INVENTOR
John F. Peters
BY
John C. Carpenter
ATTORNEY Patented July 8, 1930

1,770,041

UNITED STATES PATENT OFFICE

JOHN F. PETERS, OF ROCHESTER, NEW YORK, ASSIGNOR TO AMERICAN CAN COMPANY, OF NEW YORK, N. Y., A CORPORATION OF NEW JERSEY

ROLL BODY MAKER

Application filed November 2, 1927. Serial No. 230,542.

This invention relates in general to a can body maker, and has more particular reference to a roll feed body making machine of the type in which a can blank is positioned upon a forming horn and fed intermittently along the horn where successive mechanisms operate upon it to complete the can body.

This invention is in some respects a refinement and improvement of that type of can body making machine disclosed in John F. Peters's Patent 1,625,091 of April 19, 1927.

One of the principal objects of the present invention is to provide a high speed, fully automatic, machine with a minimum number of moving parts, to insure the least vibration in the machine and the simplest mechanical movements consistent with the work performed.

A further important object of the invention is in the provision of adjustable and removable parts, so that can bodies of various sizes may be made by substituting other operating parts for those removed, and making the proper adjustment in the other working parts for the changes in size.

A further important object of the invention is in the provision of safety devices for preventing strain or distortion of parts under abnormal conditions and insuring safety to the operator.

A still further object of the invention is in the provision of manual and automatic controls for stopping the machine practically instantaneously in case a can body becomes jammed or in any way displaced from its regular path of travel.

Numerous other objects of the invention will be apparent as it is better understood from the following description, which, taken in connection with the accompanying drawings, discloses a preferred embodiment thereof.

In the drawings:

Figure 1 is a side elevation of a machine embodying the present invention, with parts broken away to show enclosed mechanical features;

Fig. 2 is a plan view of the machine;

Fig. 3 is a diagrammatic view of the electrical controls, circuits, and operating parts;

Fig. 4 is a partial end elevation of the exit end of the machine, with some of the parts shown in section;

Fig. 5 is a sectional view of the operating mechanism directly below the parts shown in Fig. 4;

Fig. 6 is a longitudinal section taken substantially on the line 6—6 of Fig. 2, showing the can body feeding mechanism;

Fig. 7 is a section through one of the can body retaining bar members, showing a spring pressed guide block for holding a can body in place;

Fig. 8 is a transverse section taken on the line 8—8 of Fig. 1, showing details of the stopping and electrical safety devices;

Fig. 9 is a side elevation, with parts shown in section, of the feeding device for conveying the blanks from the magazine to the first operating station, as taken on a line 9—9 of Fig. 2;

Fig. 10 is a fragmentary elevation of one of the blank checking devices for accurately positioning the can blank at the notching operating station;

Fig. 11 is a side elevation, with parts shown in section, adjacent the seam closing station, as taken on a line 11—11 of Fig. 4;

Fig. 12 is a framentary cross-section of the supporting horn and side guide adjusting means, taken on the line 12—12 of Fig. 11;

Fig. 13 is a side elevation of one of the contact units for the electrical control of the machine;

Fig. 14 is an elevation, with parts shown in section, of the manual controlling lever, the safety lock, and the brake device;

Fig. 15 is a side elevation of the mechanism shown in Fig. 14;

Fig. 21 is a section illustrating the transverse feed for shifting a notched body blank into forming position, as taken on the line 21—21 of Fig. 1;

Fig. 22 is a sectional detail of the horn feeding mechanism, taken on a line 22—22 of Fig. 6;

Fig. 25 is a section taken on a line 25—25 of Fig. 1, illustrating one of the operating cam shafts and the blank edging device;

Fig. 26 is a section taken through the supporting horn on the line 26—26 of Fig. 1, illustrating another electrical control device;

Fig. 27 is a fragmentary view, partly in section, of the expanding horn at the seam closing station;

Fig. 28 is a section of the expanding horn, taken on the line 28—28 of Fig. 27; turned through one quadrant;

Fig. 29 is a side elevation, with parts broken away, showing the starting and stopping clutch mechanism;

Fig. 30 is a section of the clutch mechanism, taken on the line 30—30 of Fig. 29; and Fig. 31 is a cross-sectional detail, illustrating a device for applying soldering flux to the bent hooks of the can blank in advance of the seam closing station.

Figure 16:
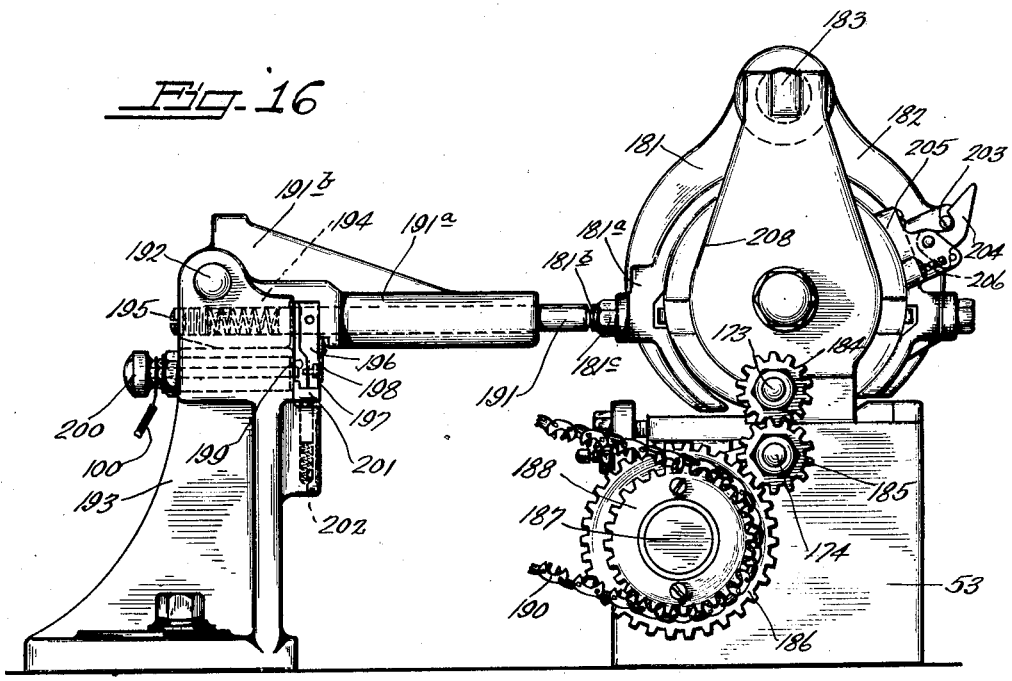
Fig. 16 is an end elevation of the supporting horn and one of the electrical control devices, as taken in a plane indicated by the line 16 in Fig. 2.

The drawings illustrate a complete machine having all the necessary features for high speed automatic production of can bodies of finished and improved quality. The forming operations are performed in the same succession as in the Peters's patent above referred to, with the addition of certain features and refinements of construction which will be pointed out in detail.

In general, sized sheet metal can blanks are deposited in a magazine from which they are removed one at a time from the bottom and fed to a notching mechanism, thence transversely through a forming device on to a forming horn. The formed blanks are advanced intermittently along the horn where the edges are first formed into hooks passed through a prefluxing device, then brought together or hooked, then the hooked edges interlocked and tightly closed. This completes the formation of the can body which is then discharged from the body maker for further operations.

In operating the body maker, a careful control of the mechanism is necessary, not only in the manual starting and stopping of the machine, but also in providing for automatic electrical stoppage whenever certain electrical contacts are made. The improved electrical and mechanical control constitutes important novel features of this machine. The invention will be described as composed of certain units, of which the operations overlap and are so associated with other units that this classification is purely arbitrary, and is made merely for the purpose of more clearly setting forth the details of the invention.

*Removal and feeding of blanks*

Referring to Figures 1, 2 and 9, a stack of sheet metal can body blanks 50 are deposited in a magazine holder, comprising uprights 51 and 52 secured to a subframe 53 mounted on a table 54, which is supported by legs 55. The edges of the blanks 50 are supported by parallel side plates 56 (see also Fig. 17), the lower engaging portions of which are formed with rounded shoulders 57. Disposed between the supporting plates 56 is a sucker arm 58 secured to a rock shaft 59 journalled in bearings 60 extending from the subframe 53. A suction cup 61 is carried at the free end of arm 58, which engages the lowermost blank 50 when the arm is raised, drawing down the central portion of the blank when the arm 58 is lowered. The suction cup is connected through the arm with a pipe 62, which extends to a vacuum pump 63, as shown in Fig. 6.

When the central portion of the lowermost blank 50 is bent downwardly by the suction cup 61, it rests upon the upper edges of a pair of feed bars 64 which carry fixed end engaging dogs 65 for engaging the rear end of the drawn down portion and spring pressed dogs 66 for thereafter engaging the rear edge of a blank 50 and feeding it in one direction due to the reciprocation of the bars 64.

The bars 64 are reciprocated by means of a slide block 67 movable in a guideway 68' in the subframe, the block being connected by an adjustable connecting rod 68 to the upper end of a lever 69, and feathered by means of a key 70 to a rock shaft 71 mounted in bearings 72 in the frame 54. Shaft 71 is oscillated by means of an arm 73 keyed thereto and connected by means of a crank arm 74 with a crank 75 formed in a shaft 76.

Figure 17:
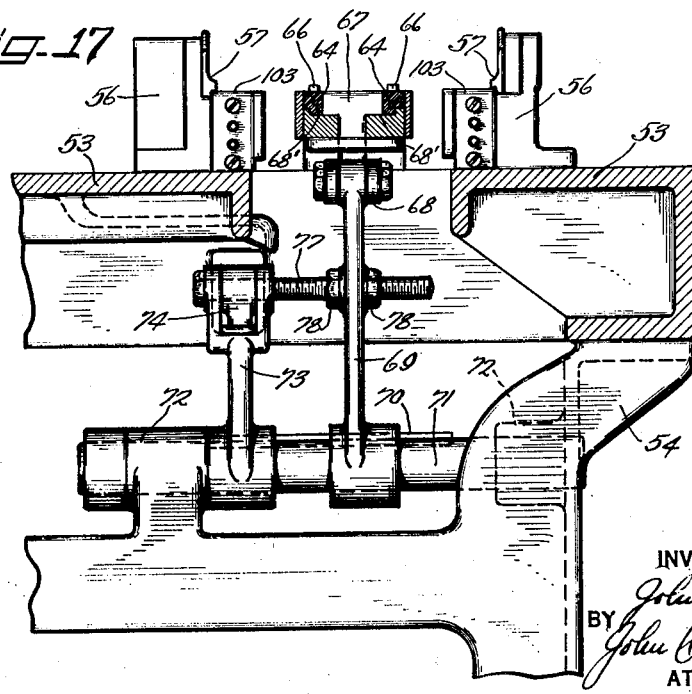
Fig. 17 is a transverse section illustrating the initial feed mechanism, taken on the line 17—17 of Fig. 2.

As shown in Fig. 17, the arms 69 and 73 are further connected to form a more rigid construction by means of a threaded bolt 77 which forms the pivot point at the upper end of arm 73 for the crank arm 74, and is adjustably secured to the arm 69 by nuts 78. By means of these adjusting nuts and the feather in the shaft 71, it is possible to shift the arm 69 upon the shaft 71 to position the feed bars 64 at the center of a blank, regardless of the width of the blank.

Oscillation is also imparted to the shaft 59 in proper timed relation to operate the suction cup 61 by an arm 79 secured to the shaft, to the free end of which a connecting rod 80 is pivoted, the other end of the connecting rod being secured to a yoke 81 which carries a cam roller 82 operating in a circular cam 83 secured to the shaft 76. (See Fig. 21.)

Figure 20:
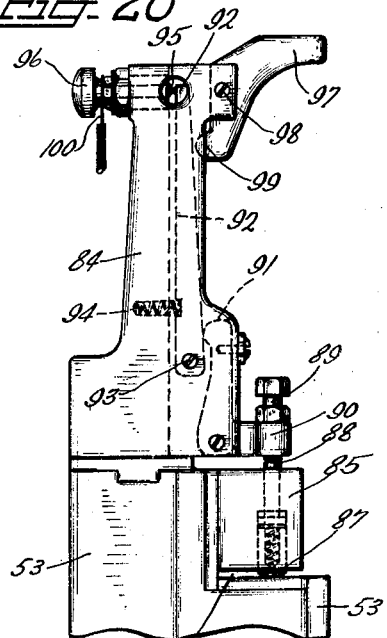
Fig. 20 is a fragmentary end elevation of one of the electrical control devices, as taken in a plane indicated by the numeral 20 in Fig. 1.

The first movement of a can blank 50 from the bottom of the magazine places it under the influence of an electrical control device, illustrated in Fig. 20. This device comprises an upright housing 84 mounted on the frame of the machine with a contact block 85 adjacent thereto and spaced above the subframe to form a channel 86, in which one edge of the can blank 50 passes as it is moved by the feed bars 64. A spring pressed button 87 is mounted in the block 85 and has a rounded extremity extending into the channel 86, so that the blank 50 engages the button and lifts it the thickness of the blank.

Extending upwardly through and projecting beyond the upper face of the block 85 is a stem 88 connected to the button 87, and engaging the upper end of the stem is an adjustable contact 89 threaded through one arm of a bell-crank 90 pivoted in the lower end of the housing 84, the other arm 91 of the bell-crank resting in contact with an arm 92 mounted upon a pivot 93 at its lower end and held normally outward against the arm 91 by a coil spring 94. The upper end of the arm 92 carries a contact pin adjacent to but spaced from a fixed contact 95 secured to but insulated from the housing 84, and having an adjustment nut 96 for an electrical conductor 100.

The normal thickness of a blank passing through the channel 86 and lifting the button 87 through the described connection, moving the arm 92 about its pivot, is insufficient to bring the contact pin carried by the upper end of the arm 92 in contact with the fixed contact 95. However, if two blanks are stuck together, or should a blank be bent or creased, the button 87 would be further lifted, which would move the upper end of the arm into engagement with the contact 95, thereby completing a circuit from the conductor 100 to the ground, with the resultant stopping of the machine.

A manually operable trigger 97 is pivoted at 98 in the upper portion of the housing, and has a lower contact portion 99 in engagement with the arm 92, so that a downward pressure on the trigger also establishes a grounding connection with the fixed contact 95.

At this stage of movement of the blanks 50 they are held downward by a plate 101 (see Fig. 9) pivoted at 102 in the subframe 53 to prevent accidental displacement of the blanks as they are fed through the various stations by the feed bars 64. During such movement, the edges of the blank rest upon the supports 103, as shown more clearly in Fig. 17. After resting at an idle station beneath the first electrical control device, and during the return stroke of the feed bars 64, the blank is advanced upon the next forward stroke to the notching station.

*Notching of blanks*

Each blank as it is brought to rest at the notching station (see Figs. 9, 18, and 19) is supported upon feed bars 64, block 67, and the continuation of the side supports 103 (as shown in Fig. 17).

To insure that the blank is in proper register with the notching die, a checking device, as shown particularly by Fig. 10, is provided. Each blank, as it is advanced by the feed bars 64 into the notching station, passes over spring pressed dogs 104 normally held in raised position by springs 105 carried in frames 106 on opposite sides of the feed bars 64. Each dog 104 is carried by a bar 107 and is adjustable longitudinally in the frame 106 by a screw 108 at one end.

As a blank is fed to the notching station it passes over the inclined upper surface of dogs 104 on opposite sides of the guideway, depressing the dogs, the blank stopping directly in front of the dogs.

To insure that the rear edge of the blank is in proper position at the notching station, it should be in contact with the dogs 104 and, if necessary, the blank is moved rearwardly from its forward feeding movement until the rear edge engages with the dogs 104. This is accomplished by means of dogs 109 having a pivot 110 for mounting it in a bar 111, adjustable longitudinally in the frame 106 by means of an end screw 112. A lower extremity 113 of the dog 109 extends below the bar 111 for engagement with a contact member to rock the upper end of the dog in the direction of the positioning dogs 104.

The dogs 109 are located at a distance from the dogs 104 slightly greater than the width of the blank 50, so that as the blank is fed into position in front of dogs 104, the forward edge engages the dogs 109 and presses them forward a slight distance about their pivots 110. When the feed bars 64 are withdrawn, the dogs 109 (as will be presently described) are rocked upwardly by engagement with the contact portions 113, engaging the forward edge of the blank and moving the rear edge thereof against the dogs 104.

The dogs 104 and 109 are separately adjustable relative to each other and to the notching station, by means of the adjusting screws 108 and 112, so that they can be properly gaged relative to the notching die.

The blanks are notched at both edges by dies 114 carried by blocks 115 secured to the lower end of slides 116 movable in guideways formed in brackets 117 mounted on the subframe 53. The slides 116 are raised and lowered by an oscillating shaft 118 connected to the slides by means of arms 119 secured to the shaft, and by links 120 having pivots 121 and 122 connecting them with the arms and slides respectively. Oscillation of the shaft 118 moves the dies 114 to cooperate with corresponding channel dies (not shown) arranged in the frame 106 in a well-known manner. Chip discharge passages 123 and 124 are provided in the subframe 53 communicating with the lower dies in the frames 106, permitting the discharge by gravity of the pieces cut from the blank.

To oscillate the shaft 118, an arm 125 is connected thereto at one end and a link 126 is connected to the free end of the arm and to a crank 127 (see Fig. 21) formed in the shaft 76. Rotation of the shaft 76, therefore, causes operation of the notching slides 116 in proper timed relation.

Figure 18:
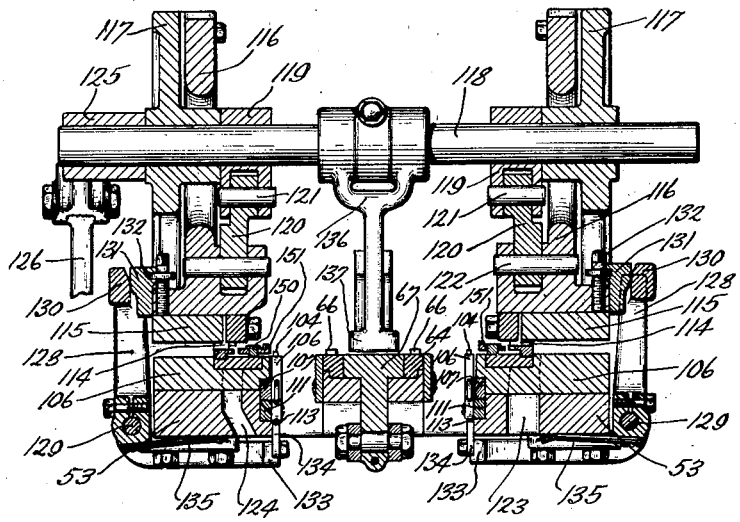
Fig. 18 is a transverse section of the notching mechanism, taken on the line 18—18 of Fig. 1.
Figure 19:
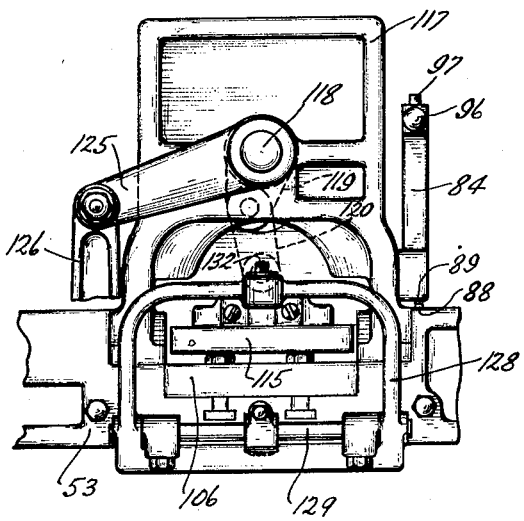
Fig. 19 is a side elevation of a portion of the notching unit shown in Fig. 18.

In order to actuate the blank positioning dogs 109, prior to the notching operation, there are two bell crank bail levers 128 mounted on pivots 129 at each side of the subframe 53, as shown more clearly in Figs. 18 and 19. The top bail of each bell crank 128 carries a contact shoe 130 engaged by a cam block 131 adjustably mounted on a slide by means of a screw 132. Downward movement of the slide 116 engages the cam block 131 with the shoe 130, oscillating the bell crank 128 about its pivot 129. The other arm 133 of each bell crank carries an upwardly projecting bar 134 positioned directly beneath and adapted to engage the lower extremity 113 of the corresponding dog 109, rotating the latter upon its pivot in the direction of the dog 104, as previously explained.

A leaf spring 135 is secured to each bell crank, with its free end bearing against the under surface of the adjacent portion of the subframe 53, to insure that the contact shoe 130 will be held at all times against the cam block 131. With this construction, the positioning of the blank at the notching station takes place upon the initial movement of the slides 116 as they are moving the notching dies 114 into cutting position and properly positioning the blank just prior to the notching action.

After the notching operation, each blank 50 is engaged by feeding dogs 66 and moved intermittently from the notching station to a rest position from which it is moved transversely into the forming mechanism by a transverse feeding device.

Figure 23:
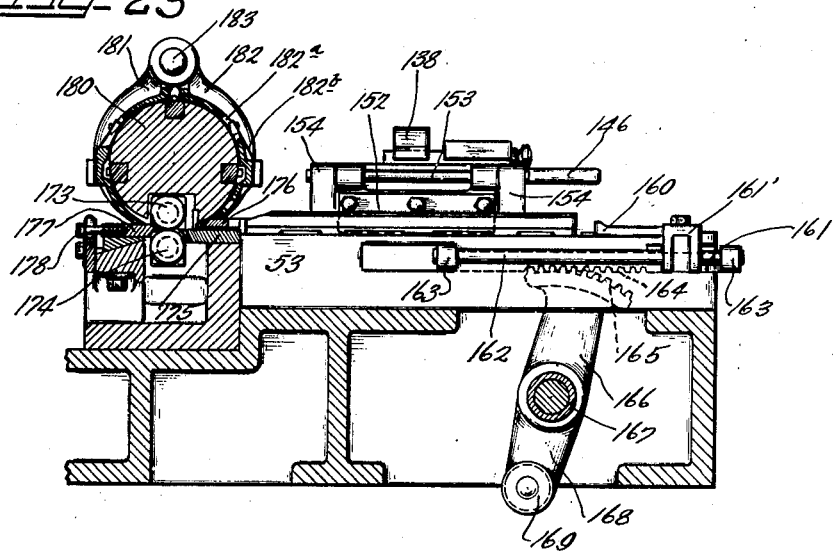
Fig. 23 is a section showing the body forming mechanism, taken on the line 23—23 of Fig. 1.

Another electrical control device is positioned for actuation by the blanks after the notching operation and comprises an arm 136 (see Figs. 9 and 18) loosely pivoted on shaft 118, having depending feet 137 resting upon plate 101 and spaced above the feed bars 64 a distance sufficient to allow a single blank to pass therebetween, and having an extension 138 adapted to engage a lever 139 (Figs. 13, 23, and 24) mounted on a pivot 140 in a frame 141 beyond the end of the path of travel of a blank 50 from the notching station. A coil spring 142 positioned in the frame below the lever 139 tends to lift a contact 143 carried at the free end thereof into engagement with a contact plate 144 connected with an electrical contact member 145, to which the conductor 100 of the detector line circuit is connected.

If two blanks 50 are passed beneath the plate 101 under the feet 137, or if a blank is creased or buckled to increase its thickness, the arm 136 and its extension 138 are raised, permitting the spring 142 to lift the contact 143 in engagement with the contact 144, thus establishing a detector circuit through the conductor 100 connected to the contact member 145.

To manually close the detector circuit, an operating lever 146 has a pivot 147 intermediate its ends with a contact arm 148 engaging the under side of the lever 139 and the outer end of the lever held upwardly by a spring 149. Depressing the outer end of the lever 146 raises the contact 143 and closes the detector circuit above referred to.

In the movement of the body blanks 50 from the magazine into the notching station and also to the position for transverse feeding after the notching station, the blanks are held down against the upper surface of the frame 106 (see Figs. 2 and 18) by spring pressed blocks 150 carried in plates 151, the blocks tending to hold the blanks flatly in the guideway.

*Transverse feed*

After each blank 50 is fed from the notching station, the forward edge engages a plate 152 (see Figs. 23 and 24) pivoted on a rod 153 mounted in brackets 154 extending from the subframe 53. This plate is held normally outward from the brackets 154 by means of one or more coil springs 155, and above the bracket the plate is adjusted to a proper position by means of a screw 156 provided with a handle 157 and operating through a bracket 158 extending from the subframe 53. With this construction, the plate 152 is closely adjusted to engage the forward edge of each blank as it arrives at this station, and the lower edge 159 of the plate 152 is beveled to assist in holding the blank downward in proper position.

A blank advanced to engage the inclined surface of the plate 152 rests on the horizontal surface of the subframe 53 with its outer end directly in front of a feeding block 160 adjustably mounted on a slide 161 which moves over the subframe 53, the adjustable connection consisting of an arm 161' extended from the block 160 the arm being slidable along and secured in adjusted position on a bar 162 movable with and held by brackets 163 projected from the slide 161. The under side of slide 161 is formed with rack teeth 164 engaged by a gear segment 165 formed on the upper arm of a lever 166 which has a central sleeve portion 167 and a lower arm 168 carrying a cam following roller 169 engaging in a cam groove 170 of a cam 171 keyed to a shaft 76 (see also Fig. 21).

The sleeve portion 167 rocks upon a shaft 172 secured at the ends in suitable brackets in the frame 54 of the machine. Rocking of the shaft 76 imparts an oscillating movement to the gear segment 165, causing the block 160 to engage the outer end of a blank, moving it toward the left, as viewed in Fig. 23. Only a slight endwise movement of the blank is necessary to place the inner end in position for engagement by the blank forming mechanism.

*Can body blank forming*

Each blank is fed transversely from its previous path of travel until the forward edge is engaged between feeding rollers 173 and 174 (see Fig. 23), the blank passing in such movement between a plate 175 and a block 176 mounted on a support of the machine. On the opposite side of the feeding rollers the blank engages a forming block 177 adjustable by means of a screw 178, which causes the blank to curl or bend upwardly in a circular path of travel around a horn 180 and beneath segmental arms 181 and 182 partially surrounding the horn and pivoted above it upon a shaft 183.

As shown more clearly in Figs. 16 and 21, the forming rollers 173 and 174 have interengaging spur gears 184 and 185 attached at their ends, and one of the gears 185 meshes with a gear 186 journalled on a stud 187 fixed to the subframe 53. A sprocket 188 is attached directly to the gear 186 and is connected directly with a high speed driving motor 189 by means of a driving chain 190.

The action of the forming rollers cooperating with the forming block 177 and the arms 181 and 182 curls a blank upon the supporting horn 180 in proper position to be moved intermittently along the horn to subsequent stations.

An electrical detector is associated with the forming mechanism, as shown more clearly in Fig. 16, in which the contact device is controlled by segmental arms partially surrounding the horn 180 about which the can body is formed. Segmental arms 181 and 182 are pivoted upon the shaft 183 to permit lifting the arms for access to the supporting horn. As shown also in Figs. 6 and 23, each of the segmental arms is provided with an opening 182$^a$ through which a leaf spring 182$^b$ is positioned with its extremities normally engaging the surface of the supporting horn and yieldingly engaging a blank 50 upon its passage about the horn during its forming operation for holding it against accidental displacement.

One of the segmental arms 181 is formed with a boss 181$^a$ (Fig. 16), which carries a contact pin 181$^b$ adjustable in the boss and locked in place by a nut 181$^c$. The outer end of the pin 181$^b$ normally engages the end of a rod 191 slidable in a sleeve 191$^a$ secured to an arm 191$^b$ and rotatable upon a pivot 192 carried by a bracket 193 mounted upon the frame of the machine. The end of the rod opposite its contact engages a spring 194 contained in a recess in the bracket 193 and adjusted in position and tension by a screw 195. A plate 196 is secured to this end of the contact rod 191, which carries a contact button 197 pressed to project through the plate by a leaf spring 198. A corresponding fixed contact 199 is carried by but insulated from the bracket 193, and has a binding post 200 at its outer end for engagement with the detector conductor 100 for closing a detector circuit.

When an abnormal condition occurs at the forming station, such as the buckling of a blank as it is being formed, the segmental arm will be pressed outwardly, the pin 181$^b$ engaging the contact rod 191 and moving the contact button 197 into engagement with the contact 199, thereby grounding the circuit from the conductor 100.

When it is necessary to have access to the supporting horn 185 at the forming station, the arm 191$^b$ is first rotated about its pivot 192 to disengage the contact rod 191 from the pin 181$^b$, whereupon the segmental arm 181 may be lifted. Lifting of the segmental arms 181 and 182 is done only when the machine is stopped, and it is very important that the machine is not again started until the arms are returned to their normal position and the contact device properly positioned.

To insure repositioning of the contact rod 191, a spring pressed contact member 201 is mounted in a recess below the fixed contact 199 and in position to be engaged by the end of the contact plate 196 carried by the contact rod 191. A spring 202 tends to press the contact member outwardly into engagement with the fixed contact 199 with which it would make a grounding electrical connection with the frame of the machine, thus also completing the detector circuit from the conductor 100 and preventing the operation of the machine. When the arm 191$^b$ is again lowered to normal position, the contact 201 must be manually depressed in order that the end of the plate 197 will engage it and press it into proper position. This insures that the arm 181 will be held in normal position under the action of spring 194.

In order to hold the segmental arm 182 in proper position, a pin 203, projecting from the arm 182, is engaged by a catch 204 pivoted in a projection 205 secured to the supporting horn 180 and having a spring 206 for pressing the catch normally in engagement with the pin 203. Thus the arm 181 is held yieldingly toward the forming horn and the arm 182 is held in an exact fixed position relative to the horn by means of the catch 204, both yielding and fixed connections being necessary to hold a formed blank in position thereon and at the same time permit operation of the electrical control device through movement of the rod 191 in case of improper feeding of the blank.

*Feeding blanks on the forming horn*

After the can body blanks 50 are curled about the horn 180 under the confining arms 181 and 182, they are fed intermittently along the horn by a plurality of reciprocating feed bars 207 (see Figs. 6, 7 and 22), located in recesses in the horn, so that the outer surfaces of the bars will be flush with the curved surface of the horn. The forming end of the horn is supported and secured in place by a bracket 208 in which the adjacent end of shaft 183, upon which the arms 181 and 182 are pivoted, is also supported.

The feed bars 207 carry spring pressed dogs 209 which engage the rear edge of the blank as the feed bars are moved rearwardly, advancing each blank the distance of the forward feed of the bars and bringing the body blanks under the influence of spring pressed guide blocks 210 (similar to the guide blocks 150 shown in Figs. 2 and 18) carried in openings in bars 211 secured to segmental arms 212 and 213 loosely mounted on shaft 183 above the horn 180, and raisable for access to the supporting horn 180. Each block 210 is held in an opening 214 in the bar 211 (Fig. 7) and it is pressed inwardly under the tension of leaf springs 215 carried by the bar 211. A plate 216 secured to the block 210 and overlying the outer surface of the bar 211 across the opening 214 therein prevents accidental displacement of the block. These blocks act as clamps for holding the blanks 50 in position, while the bars 207 are moved idly upon their rear stroke.

The feed bars 207 are secured to a slide 217 intermediate the ends of the bars, and the slide is connected by an adjustable link 218 to an oscillating lever 219 pivoted on a cross-shaft 220 carried by the machine table 54. This lever 219 is oscillated about shaft 220 by a crank arm 221 connected at one end to the lever, and at the other end to a crank 222 formed in shaft 76, (see Fig. 21). Continuous rotation of the shaft 76 causes the feed bars 207 to reciprocate in the horn 180 intermittently feeding the can body blanks along the horn. There are a number of idle positions between the forming station and the next operating station along the horn, which is the edging station, the blanks merely resting at these idle positions without any operations being performed thereon. It should be understood that this feeding mechanism transfers the blanks throughout their movement upon the forming horn 180.

As shown more clearly in Fig. 6, lever 219 has an extension 223 below its pivoting shaft 220 connected to a piston rod 224 of the vacuum pump 63, which is connected to the suction cup 61, as previously explained.

The blocks 210, which project inwardly from the bars 211, are carried by the segmental arms 212 and 213, and these arms can be raised about the shaft 183 for access to blanks on the forming horn 180, and one or more of the arms 212 and 213, at each side of the horn, are provided with a yielding catch for securing them in normal position. This catch, as shown more clearly by Figs. 6 and 26, comprises a shaft 225 rotatable in lugs 226 formed at the lower extremity of adjacent arms at either side of the horn, the shaft being oscillatable by a handle 227 to engage a segmental extension 228 at the ends of each shaft with a sliding block 229. Each block slides upon a stud 230 extending from a bracket 231 secured to the frame of the machine. A coil spring 232, positioned about the stud 230 and adjustably held by nuts 233, presses block 229 inwardly engaging segmental extensions 228 of the shaft 225, thereby forcing the segmental arms yieldingly inward.

To disengage either segmental arm, the corresponding handle 227 is raised to a vertical position, which rotates the segmental extension 228 out of contact with the block 229 and permits the corresponding arms 212 or 213 to swing upwardly about the shaft 183.

An electrical detector circuit is associated with the restraining means for the arms 212 and 213, comprising a sliding button 234 engaged by the inner face of each block 229 when the latter is in its normal inward position, the button engaging a spring contact blade 235 secured to the inner face of the bracket 231 and holding the blade out of engagement with a fixed contact pin 236 carried by but insulated from the bracket 231. When the arms 212 or 213 are forced outwardly by a buckling of a can body blank on the supporting horn 180, the block 229, for a corresponding arm, is moved outwardly against the action of spring 232, permitting the contact blade 235 to engage the contact pin 236. At the outer end of the contact pin 236 is a binding post 237 for conductor 100 of the detector circuit which causes immediate stoppage of the operating part of the machine.

*Edging the body blank*

A notched and formed can body blank is moved intermittently along the supporting horn until it reaches an edging station, illustrated more clearly in Fig. 25. At the bottom of the supporting horn 180 steel forming plates 238 are inserted and form terminal supports for edges of the blanks 50. The extremities of the edges extend slightly beyond the edging plates 238 against which the edges are clamped to form oppositely extending hooks. A movable clamping plate 239 cooperates with forming plate 238 at each side of the horn and is carried by a bar 240 adjustably secured by studs 241 to a lever 242 having a pivot 243 in a support 244 mounted on subframe 53 positioned above a slidable plate 245.

In clamping opposite edges of a blank prior to bending the edges, the plates 239 are raised against the surface of the blank, pressing the edges against the forming plates 238, the raising action being accomplished by moving the slidable plate 245. For this purpose the opposite levers 242 are connected by pivoted links 246 and 247 to the opposite sides of the sliding plate 245. This construction thus acts as a toggle, and movement of the sliding plate 245 toward the left, as shown in Fig. 25, raises both of the plates 239 to clamping position. Movement of the plate 245 is controlled by a cam roller 248 carried by the plate engaging in a cam groove of a cam 249 mounted on the horizontal shaft 250.

After the ends of a body blank are firmly clamped against the supporting horn by the clamping plates 239, the projecting portion of the edges are bent in opposite directions by means of an oscillating edging tool 251 carrying edging steels 252 for cooperating with the clamping plates 238 and 239, the edging steels being held adjustably in place by clamping plates 253.

To oscillate the edging tool 251, one end of the tool projects beyond the bracket 231, as shown more clearly in Fig. 6, where it is secured to an arm 252' which extends downwardly and is connected at its lower end to one end of a bar 253' of which the other end (see Fig. 25) is connected to the upper extremity of a lever 254 pivoted at its lower end on a stub shaft 255 mounted in the table 54. Intermediate the ends of the lever is a cam following roller 256 mounted on a bearing pin 257 and engaging in a cam groove 258 of a cam 259 secured to one end of shaft 250.

Continuous rotation of shaft 250 oscillates the lever 254 and oscillates the edging tool 251 about its own axis in timed relation to form oppositely extending lugs on the edges of each body blank as it is clamped on the supporting horn 180.

*Prefluxing device*

To insure that solder will flow into the side seam of the can when it is to be hermetically sealed, a fluxing device, as shown in Figs. 11 and 31, directly below the horn 180, is adapted to engage a hooked extremity 260 of a body blank after it is edged.

A formed edge 260 engages a slotted plate 261 secured to the frame of the machine and projecting in an opening 262 in the bottom of the supporting horn 180. This plate 261 is in contact with a fluxing roller 263 secured at the end of a shaft 264 journalled in bearings 265 formed at the top of a fluxing pot 266. A sprocket 267 is attached to the other end of the shaft 264, and the shaft is driven by a sprocket chain passing around this sprocket and around a sprocket 268 mounted on shaft 250 (Fig. 25), the chain being not shown but its position being indicated by a housing 269 shown in Figs. 2 and 25.

Liquid flux contained in the pot 266 is lifted by roller 263 and is wiped off by the plate 261, the flux entering the slot of the plate. As the hooked edge 260 of a body blank is moved along the slot in the plate 261, the flux is deposited on the inside and outside of the extremity of this hook. Flux is supplied to the pot 266 from a supply tank 270 (Fig. 2) communicating with the pot by means of pipes 271.

When no prefluxing operation is desired, the flux is removed from the pot 266 and the machine operates in the regular manner without applying flux to the can bodies and without interfering with any other operations upon the can body.

*Seam closing*

The last operations in the formation of a can body are interhooking the formed edges of the blank and closing the interhooked parts in a finished side seam. The mechanism for performing the operations is shown more clearly in Figs. 4, 5, and 11, the can body blank being first brought to rest by the feed bars 207 and securely clamped at the upper side of the horn 180. The hooked edges of the blank are then interengaged, the blank being securely wrapped around the horn and held in position, the horn is then expanded to cause the interengaged hooks to assume a locked position, this expanding action properly sizing the can body, and the interhooked parts are closed in a final seam by means of a bumping hammer.

As shown more clearly in Figs. 4 and 11, the horn 180 has a reduced portion 272 at this station, the upper edge of which is continuous with the other portion of the horn. An overlying shoe 273 normally rests on the horn portion 272 and is loosely supported above the horn in a depending bracket 274 secured to the web 275 of a supporting frame 276. The forward edge of the shoe is formed with an inclined surface 277 to insure that the can bodies as they are moved along the horn 180 to the reduced portion 272 will engage below and slightly raise the shoe 273.

A vertical pin 278 engages the upper part of the shoe 273 and the upper end of this pin extends into contact with a wedging pin 279 slidable transversely in a bracket 280 mounted upon the web 275. When the can body is brought to rest below the shoe 273, the wedge pin 279 is moved toward the right, as viewed in Fig. 4, and the inclined surface of the pin is pressed downwardly upon the vertical pin 278, forcing the shoe 273 downwardly in clamping contact with the can body thereunder.

To actuate the wedging pin 279, one arm of a bell crank 281 is pivotally connected to the wedging pin 279, the bell crank being journalled on a pivot 282 supported by an extension of the bracket 280, and the opposite end 283 of the bell crank is adjustably secured by means of nuts 284 to the upper threaded end of a vertical rod 285, the lower end of which carries a yoke 286 (see Fig. 5) carrying a cam following roller 287 operating in a cam groove 288 of a cam 289 keyed to a shaft 290, the yoke straddling the hub of the cam 289. Operation of the cam 289, therefore, raises and lowers the rod 285, rocks the bell crank, and moves the wedging pin 279 in timed relation into clamping and unclamping positions.

After the can body has been securely clamped at the top of the horn by the shoe 273, the opposite sides of the body are engaged by jaws 291 and 292, actuated in proper timed relation to bring first one side of the hooked can body into contact with the reduced horn 272, and thereafter to move the other side of the body to permit interengagement of the hooked edges. These jaws are actuated by operating mechanisms, each comprising a lever 293 pivotally connected by a link 294 to a bracket 295 adjustable on the web 275 by a clamping bolt 296, which passes through a slot in the bracket, permitting vertical adjustment thereof. This vertical adjustment is assisted by means of adjusting screws 297 threaded through extensions 298 of the web and engaging the lower side of the bracket 295. By this means, each bracket is independently adjusted for exact positioning of the corresponding jaw.

A slight rocking movement is given separately to the levers 293 by means of a bell crank 299, one arm of which is connected by a pivot 300 with the lever 293, and the other arm is connected by a similar pivot to a spring connecting rod 301 mounted at the free end of an arm 302 keyed to a stub shaft 303.

There are two of these stub shafts 303, one for each of the jaws 291 and 292, both journalled in the web 275, and, as shown more clearly in Fig. 25, each shaft has keyed to it an arm 304 carrying a cam following roller 305 engaging in cam grooves 306 of cams 307 keyed to the shaft 250. The timed movement of the levers 293, controlling the jaws 291 and 292, interengages the hooked edges of the can body as it is held on the reduced portion of the horn 272 by the shoe 273, and the interhooked edges are sized and brought into squared relation by an expanding mechanism, as shown more clearly in Figs. 27 and 28.

The reduced horn portion comprises side plates 308 secured to the central portion 309 by screws 310, around the head portions of which are springs 311 bearing against a plate 312; secured to the inside of the side plates are fastening screws 313. The central portion 309 and the side plates 308 are confined at the ends by collars 314, as shown in Fig. 27. The central portion 309 is formed with an extension 315 secured to the supporting horn 180 (see Fig. 11).

Side plates 308 are expanded by means of a sliding wedge pin 316 having cam surfaces 317 engaging blocks 318 carried by screws 319 secured in the side plates 308 (Fig. 27).

As this wedge pin 316 is moved longitudinally, the blocks 318 are engaged, moving the side plates 308 outwardly and expanding a can body carried thereby to the desired extent. When the wedging pin 316 is moved in the reverse direction, the springs 311 return the side plates 308 to their retracted position. To operate the wedging pin 316, one end is formed with a slotted head 320 engaging the upper end of an operating lever 321, which is mounted loose on the shaft 327 and carries a laterally extending pin 322 (see Fig. 6) engaged between two adjusting screws 323 extending from opposite sides of an arm 325 into an opening 324 of said arm 325, into which opening the pin 322 extends, the arm 325 being secured to a rock shaft 327 whereby the turning of the rock shaft swings the arm 325 with its screws 323 and said screws move the pin 322 and the latter swings the lever 321 at the proper time. An arm 328 (see also Fig. 5) is secured to the rock shaft 327 (Fig. 6), the free end of which is connected with a vertical link 329, the lower end of which has a yoke 330 to straddle the hub of a cam 331 keyed to shaft 290 and carrying a cam following roller 332 engaging with a cam groove 333, thereby raising and lowering the vertical link 329 and correspondingly rocking the lever 321 to move the wedging pin 316 in proper timed relation with respect to the expanding side plates.

To close the seam formed by the interhooked edges of the body blank, a bumping hammer is mounted below the reduced horn portion 272 and comprises a bumper plate 334 adjustably secured in a central slot of a hammer 335 by clamping bolts 336. The adjustment is provided so that the plate 334 may be made parallel with the lower surface of the horn 272. High end straighteners 337 are disposed at the ends of bumper plate 334, and each straightener is vertically and slightly laterally movable in guideways 338 of the hammer 335, but is frictionally held at all times by contact pins 339 engaging the straighteners 337, and having an expanding coil spring 340 pressing the pins 339 into contacting engagement.

In operation, the straighteners 337 are raised in advance of the contact plate 334 and at such times are spread apart to engage and align the interhooked edges at the ends of the can body previous to the contact of plate 334. For this purpose, each straightener 337 is provided with extension lugs 341 extending through an opening 342 in the side wall of the hammer. As the hammer is brought down to its lowermost position each lug 341 is engaged by one arm of a bell crank 343 mounted on a pivot 344 supported by a movable slide 345 which carries the hammer 335. The other arm of bell crank 343 engages a cam block 336' carried by one of the guides 337' which form a guideway for the slide 345, the block being engaged as the hammer slide and bell crank 343 approach the lowermost end of the stroke. This causes the bell crank to raise the straightener to a position above the contact plate 334, as illustrated in Fig. 4, the straightener being frictionally held in this position and the two straighteners engaging the ends of the can body blank before the bumper plate 334 closes the side seam.

The hammer 335 is moved by the slide 345, on which it is mounted, the slide being connected by a pivot 346 to a block 347 having an extension 348 adjustably connected to a sleeve 349 of a crank 350 on the shaft 290. A coil spring 351 is interposed between sleeve 349 and the block 347 to cushion the blow of the hammer 335 against the interhooked edges of a blank upon horn 272. This engagement of the hammer finally closes the seam and completes the formation of the can body.

The fully seamed can body is then moved from the horn 272 on to the sub-horn (Fig. 11) from which it is removed or conveyed to any suitable place, usually to the side seam soldering machine.

*Adjustments*

This machine is constructed to provide for adjustments and the substitution of parts for forming different sizes of can bodies within certain limits.

In the magazine holder the uprights 51 and 52 may be moved along the subframe 53 and clamped in adjusted position to accommodate the particular size of blanks to be made into can bodies.

Many of the operating parts are formed in two sections for the purpose of adjustment. The guideways for the feeding movement of the body blanks 50 are spaced apart upon the supporting table 54, as illustrated in Figs. 2, 9 and 18, and the blocks 352 are carried on the under surface of parts of the subframe 53 engaging in an under cut slot 353 extending transversely at the top of the table 54. Adjusting screws 354 are carried by the table extending through the blocks 352, and each screw is formed with right and left hand threads, so that rotation of the screw will move the blocks 352, causing the parts of subframe 53 to move oppositely. To insure parallel movement of subframe parts 53 throughout their length, the screws 354 are connected for conjoint movement, as shown in Figs. 1 and 2, by a chain 355 passing around sprockets 356 mounted on the extremities of the screws. Each screw has a square head 357, to either of which a wrench is applied for adjusting both screws at the same time.

This adjustment of the subframe parts 53 varies the longer dimension of the magazine for receiving the can body blanks, and adjusts the guideways for the blanks at the notching station and to the end position where the blanks are fed transversely to the forming mechanism.

Figure 24:
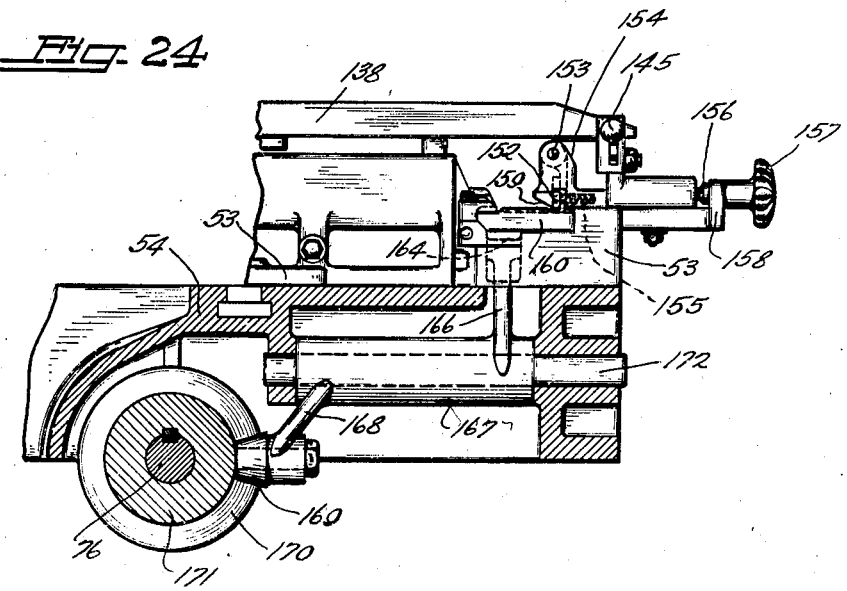
Fig. 24 is a fragmentary view partly in section of the transverse feeding device for notched blanks, taken on a line 24—24 of Fig. 21.

Provision is also made for adjustment of the parts at the transverse feeding station, as illustrated in Fig. 24, the bracket 154 being movable back and forth by screw 156 to place it in proper position for blanks of various sizes.

Forming rollers 173 and 174 are of sufficient length to take care of a blank of the greatest width, and need not be changed for different sizes of blanks.

Supporting horn 180, the feed bars 207, and other parts relating to the supporting horn, are replaceable parts, so that when a body blank of a length to make a different diameter of formed can body is to be made, the supporting horn and all parts therefor are bodily removed and replaced by other parts of same construction but differing in size. In this replacement it is necessary to disconnect slide 217 from the lever 219. (Fig. 6.)

A replacement necessitates adjustment of supporting bracket 274 and all parts connected therewith, and for this purpose the bracket is provided with an adjusting screw 358 (see Fig. 4) having a threaded connection with the frame 276 and operated by a hand wheel 359, the screw being locked in any adjusted position by a hand wheel 360 movable against the frame 276 and acting as a lock nut. If necessary, the bell crank 281 is adjusted relative to the rod 285 by movement of the lock nuts 284. Clamping jaws 291 and 292 are also replaced for can bodies of different diameters, these constituting the so-called change parts.

The lower position or elevation of the supporting horn 180 and parts carried thereby is maintained regardless of the diameter of the horn, and, therefore, no adjustment is necessary for positioning the member 335. However, the hammer and parts carried thereby are easily replaced for can bodies of different heights.

As shown more clearly in Fig. 12, provision is made at the bottom of the horn 180 to adjust contact steels 361 and 362 for guiding the edges of the blank, comprising plates formed with notches 363 and 364, into which the edges of the formed and hooked blank move. The plates are held adjustably at the bottom of the horn by adjusting screws 365, which permit the plates to be moved laterally and by a lock nut 366 which firmly clamps the plates in adjusted position.

Sub-horn detector

When a formed can body is discharged from the horn 180 it passes to a sub-horn 367 (see Fig. 11), which is a substantial continuation of the forming horn, the can body passing below a shoe 368 mounted on a pivot 369 in a bracket 370 secured to the frame 276. Adjacent the pivot of the shoe 368 is a contact surface 371 adapted to engage the face of an extension 372 of the bracket for holding the shoe in exact position over the sub-horn 367 to permit but a single can body to pass thereunder. This face 371 engages a contact pin 373 projecting through the extension 372 of the bracket and the opposite end of this pin being adapted to engage a spring contact plate 374 holding it out of engagement with a fixed contact pin 375 carried by but insulated from the extension 372 of the bracket 370. The detector conductor 100 is secured to the contact pin 375 by nuts 376 for establishing a grounded connection to the wire when the shoe 368 is raised. If a can body is buckled or a jam occurs below the shoe 368, it is correspondingly raised, allowing the spring contact plate 374 to make a grounding engagement with the contact pin 375.

The shoe 368 is swung upwardly about its pivot to give access to the sub-horn 367 below it, and at such time the detector circuit is established and remains closed to prevent starting of the machine until the shoe is replaced in normal position.

Driving mechanism

The transfer shafts 76 and 250 are rotated from main shaft 290 (see Figs. 1, 5, 21 and 25) by means of sprockets 377 and 378 keyed to shafts 76 and 250 about which a sprocket chain 379 passes and by means of sprockets 380 and 381 fixed to the shafts 250 and 290 respectively about which passes a driving chain 382. This chain connection insures that the operating parts may be actuated in proper timed relation, providing accurate working and proper cooperation of the parts.

A power driving connection is made to shaft 290 through a suitable clutch mechanism, as shown in Figs. 5 and 30. A hollow gear 383 is connected by a clutch mechanism 384 to the main shaft 290 and is in constant mesh with a pinion 385 mounted on a horizontal shaft 386 journalled in bearings 387 formed on the supporting frame of the machine. This shaft 386 is continuously operated by a bevel gear 388 meshing with a similar gear 389 secured to the lower end of a vertical shaft 390 encased in a sleeve 391. The sleeve 391 connects with a gear box 392 (see Figs. 1 and 2) in which is a suitable drive gear connecting vertical shaft 390 to a horizontal drive shaft 393 carrying drive pulleys 394, to which power is communicated from any outside source as by means of a belt 395. A sliding handle 396 (Fig. 1) operates a belt shifting device 397 and this constitutes the first manual control for the machine.

Clutch mechanism

A second manual control for the machine comprises the clutch for connecting the hollow gear 383 with the driving shaft 290, as shown in Figs. 5, 29, and 30.

The shaft 386 and the hollow gear 383 are continuously operated as long as the first manual control is in proper position, and the clutch 384 for connecting the hollow gear 383 with the drive shaft 290 comprises a hub sleeve 398 freely rotatable on shaft 290 with a slide collar 399 mounted thereon carrying a wedging pin 400 slidably held in a part of the wall of gear 383. Mounted inside of the hollow gear 383 are two expanding clutch shoes 401 to engage the inner peripheral wall of the gear 383, and each shoe has a perforated lug 402 at its lower end contacting with an eccentric pin 403 controlled by an arm 404 moving about the axis of the pin and adjustably held by a set screw 405, clamping it against the face of a clutch disc 406 securely keyed to the shaft 290. By means of this adjustment, the perforated lugs of the clutch shoes are moved to shorten or lengthen the effective clutching surface. The lugs 402 are held yieldingly against the adjusting pin 403 by coil springs 407 secured to a pin 408 extending through the lugs 402.

A lever 409 is pivoted at one end to the opposite end of one of the shoes 401, and is pivotally connected intermediate its ends with the adjacent end of the other shoe 401, so that the free end 411 of the lever 409 is disposed inwardly in position for engagement by the forward edge of pin 400 as clutch collar 399 is moved inwardly, and this action forces the lever 409 outwardly, expanding the clutch shoes 401, thus causing a clutching engagement between the hollow gear 383 and the clutch disc 406 which is secured to the shaft 290.

A spring pressed ball detent 412 is provided in the collar 399 and snaps into either one or the other of two depressions 413 formed in the hub 398, providing a catch for holding the collar 399 in clutched and unclutched position.

To operate the clutch, a bifurcated arm 414 carries a clutch ring 415 engaging the clutch collar 399, the arm being secured to a rock shaft 416 journalled in bearings 417 formed in the frame of the machine.

Also secured to this rock shaft 416 (see Fig. 8) is an arm 418 pivotally connected to one end of an adjustable slide rod 419 connected at its other end to an operating handle lever 420. This connection between the handle lever and the clutch 384 is for manual operation of the clutch for connecting the operating parts of the machine with the driving mechanism. The position of the handle lever, illustrated in Fig. 14, is the stop position for the operating parts, and, as shown in Fig. 8, the lever is holding the clutch in the operating position.

*Brake and lever control*

The operation and stopping of the machine is controlled and guarded by mechanisms shown more clearly in Figs. 14 and 15, comprising a fly wheel 421 secured to one extremity of the main shaft 290. A brake shoe 422 is pivoted in a lug 423 extending from the frame of the machine, and the contact surface of the shoe is adapted to engage the periphery of the fly wheel 421. At the free end of the shoe is an extension 424 which carries an inclined block 425 movable in a slot 426 formed in a bracket 427 secured to the frame of the machine. The brake shoe falls by gravity out of contact with the fly wheel and is raised by a slidable wedge pin 428 extending into the bracket 427 and having an inclined surface adapted to engage the inclined surface of the block 425 for raising it, the other end of the pin 428 being pivoted to one arm of a lever 429 loosely mounted intermediate its ends on a stud 430 projecting from a bracket 431. The handle lever 420 is also pivoted on the stud 430, and the upper end of lever 429 is normally held in contact with the handle lever 420 by means of a pin 432 provided with a head 433 slidable in the upper end of lever 429 and adapted to engage one of two openings 434 formed in the handle lever 420 and held yieldingly therein by a coil spring 435 surrounding the pin 432.

By this connection, the lever 429 is in effect a part of operating lever 420, moving therewith and operating the wedging pin 428 to actuate the block 425 for operating the brake shoe 422 engaging and stopping the fly wheel 421. An adjusting screw 436 and a lock nut 437 are provided for adjusting the wedging block 425 to vary the contact of the shoe 422 with the fly wheel.

In making adjustments or repairs, it may be necessary to disengage the brake shoe from the fly wheel, even though the hand lever 420 is in the unclutching position, as shown in Fig. 14. The releasable connection between the levers 429 and 420 permits such disengagement by withdrawing the pin 432 and moving the lever 429 to the broken line position, as shown in Fig. 14, whereupon the pin is released and engaged in the right hand opening 434 in the handle lever 420. This moves the lower end of lever 429, withdrawing the wedging pin 428 and allowing the brake shoe 422 to fall by gravity out of contact with the fly wheel. The shaft 290 is then free and may be turned in its bearings by an ordinary crowbar inserted in radial hole 438 in its periphery.

To prevent the damage which may result by leaving a crowbar in a hole 438 when a machine is started, a guard 439 is provided having a circular shape partially covering the periphery of the fly wheel and provided with vertical arms 440 for connecting it by parallel pivoted links 441 to a bracket 442 projecting from the frame of the machine. These links permit parallel movement of the guard from its raised position, as shown in Fig. 14, to a lowered position, as shown in Figs. 8 and 15, in which the guard closely overlies the upper part of the fly wheel 421.

In its raised position, the guard is held by the engagement of an extension 443 with a latch 444 having an operating handle 445. The extension 443 not only projects sufficiently to engage the latch 444, but also lies in the path of the handle lever 420.

When the handle lever 420 is in its unclutching position, as shown in Fig. 14, and the guard 439 is raised and held upwardly by the latch 444, the handle lever is confined between the extension 443 and the frame of the machine and cannot be moved outwardly about its pivot 430 without a manual operation of the latch 444 by its handle 445. Releasing the latch 444 permits the guard 449 to fall by gravity to its position over the fly wheel, and if there is a crowbar in any of the bores 438, the guard is prevented from moving downwardly and the bar must be removed before the handle lever 420 can be operated and the machine started.

The guard 439 remains in the position shown in Figs. 8 and 15, unless it is desirable to turn the main shaft 290 by hand or with the aid of a crowbar, whereupon it becomes necessary to manually lift the guard by means of a grip 446 formed between the arms 440.

*Automatic operation of hand lever*

When an abnormal condition occurs in any of the various operations connected with the machine, the operating lever 420 and its connected parts for operating the clutch 384 are automatically shifted by a combined electrical and mechanical means, associated with the electrical contacting devices which have been described in connection with the various parts.

One of the rock shafts 303 which is mounted in the machine frame, as shown in Figs. 6 and 8, carries an arm 447 fixed thereto, which reciprocates a latch bar 448 pivoted thereto in accordance with its movement. The engaging end of the latch bar is pivoted to the upper end of a link 449 which is pivoted at its lower end to the stem 450 of the solenoid 451. The constant to and fro movement of the latch bar 448 is above but normally out of contact with the connecting rod 419 for the operating lever 420. Directly below the latch bar and secured to the connecting rod 419 is a latch block 452 having a projection 453 adapted to be engaged by the latch bar 448 when the latch bar is allowed to fall into the path of the projection 453. Normally the solenoid 451 is energized, holding the latch bar 448 in raised position, where it does not engage the shoulder 453 in its oscillation back and forth, but if the circuit including the solenoid is grounded or otherwise interrupted, so that sufficient current does not pass through the solenoid, it will allow the latch bar to fall into the path of the projection 453, so that the next oscillating movement of the latch bar will engage the shoulder and move the connecting rod 419 in a direction to disengage the clutch 384.

A smooth and even movement of the connecting rod 419 is insured by a dash pot 454 suspended about the rod 419 by a link 455 secured to a projection 456 from the frame of the machine. A piston 457 carried by the connecting rod meets resistance with air or any suitable fluid which may be contained within the dash pot 454 to form a shock absorber for preventing a too violent movement of the connecting rod 419 and its operating lever 420.

*Electrical safety control*

A number of circuit closing connections have been described in connection with the various operating devices of the machine, so that when an abnormal condition occurs in any of the several places a circuit will be closed to the ground, thereby shunting some of the current ordinarily supplied to the solenoid 451 for operating the latch bar 448 to disengage the clutch as described.

Referring more particularly to Fig. 3, a wiring layout illustrates diagrammatically the automatic control of the solenoid 451 through the connections which have previously been described.

Current is received from any suitable source and conveyed in a circuit to the solenoid 451 through conductors 460 and 461, the latter being connected to a ground 462, which in the present instance is the frame of the machine. The current ordinarily received by solenoid 451 is sufficient to energize it and raise the latch bar 448 free from engagement with the shoulder 453 of the latch block 452. A lamp 463 is connected in series with the solenoid and gives visible evidence of the flow of current and furthermore acts as a valve, permitting variation in the flow of current and giving visible evidence of this variation. The entire control system is operated upon the shortening or shunting principle, and the current normally flowing through the solenoid 451 and the lamp 463 meets with a relatively high resistance, causing the lamp to light with only a fraction of its full brilliance. When any trouble occurs throughout the machine, a short circuit is established, which deenergizes the solenoid 451, and as the current, which then operates as a detector, still continues to flow through the lamp 463, but with less resistance, the increased brilliance of the lamp 463 is a visible indication of a shunt current and the deenergization of the solenoid; or, in other words, would indicate that trouble has developed at some part of the machine, and that the operating parts of the machine have ceased to function.

In the wiring diagram, a number of different contact devices 464 are represented as connected to a conductor 100, and the opposite contacts spaced therefrom are represented as connected by means of a conductor 465 to a ground 466. These contact devices 464 represent the various detector circuit contacts described in detail at the various points throughout the machine; at the side and end of the blank feed guideway; at the forming end of horn 180 in connection with arm 181; in advance of the edging mechanism in connection with the arms 212 and 213; and in connection with the sub-horn contact shoe.

These detector contacts closed automatically or manually, as described, complete a shunt or detector circuit, the conductor 100 being connected with a spring contact blade 467 (see also Fig. 8), a similar blade 468 being connected by conductor 469 with the power line 460. The lever 418 associated with the mechanism for operating the clutch 384 carries a contact pin 470 which is insulated from the lever but forms a path for current between contact blades 467 and 468 when connecting rod 419 and handle lever 420 are in the right hand or operating position, as shown in Fig. 8. This pin 470, therefore, forms a path for current only when the handle lever 420 is in the operating position, it being unnecessary to close a detector circuit when the handle lever is in the stop position.

The detector circuit conductor 100 also leads to a contact point 471 of a further independent contact device used in connection with the electric motor 189 which rotates the forming rollers. This motor is represented as receiving current through a switch 472 carrying a contact plate 473 adapted to make connection with the contact point 471 and another contact point 474 connected by a conductor 475 to the grounded feed wire 461. The contact plate 473 is brought into engagement with the contact points 471 and 474 whenever the switch 472 (which may be of an automatic circuit breaker type) is opened and the motor 189 ceases to operate. This, therefore, constitutes another detector control which is only operative when the motor stops. The motor may stop whenever there is an overload, which may be caused by a can body sheet jamming in the forming rollers.

The closing of any one of the detector contacts, manually or automatically, or the cutting off of current in motor 189, will establish a detector circuit of less resistance than the normal circuit through the solenoid 451 which will thereby be deenergized, moving the operating lever 420 to unclutching position, and at the same time applying the brake 422 to the fly wheel 421.

Thus it will be seen that while the machine is manually controlled for normal operation, an automatic safety control is provided, not only for stopping the operating parts of the machine for the can body blanks so jammed or improperly fed, but also for preventing the operation of the machine until proper conditions are restored. Furthermore, the manual controls for the detector circuit are distributed about the machine so that it is not necessary for an operator to reach the operating hand lever in stopping the machine, as the manual operation of any of the electrical contact devices will quickly accomplish the same result.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. In a machine for making can bodies, the combination of associated mechanisms operating in timed relation for forming a sheet of tin plate or the like into a can body with the edges arranged in hooked interengagement and thereafter compressing the interengaged hooked edges to form a side seam, means transporting the can body past said successive mechanisms, and detectors arranged at a plurality of points past which the partially formed can body is moved for successive operations, said detectors being adapted to detect malformation and excessive thickness of a part of the material being worked upon and to interrupt operation of the machine upon presentation of the subject article in malformed condition or of excessive thickness.

2. In a machine for making can bodies, the combination of a plurality of successively operating mechanisms to which a sheet of tin plate is successively presented for operation thereupon to ultimately produce a formed can body, said mechanisms including notching devices for operating upon the edge of a blank, means transferring the can body blank past said notching mechanism and past also other operating stations, and detectors arranged upon opposite sides of said notching mechanism to determine the condition of the blank both before and after the notching operation.

3. In a machine for making can bodies, the combination of a plurality of successively operating mechanisms to which a sheet of tin plate is successively presented for operation thereupon to ultimately produce a formed can body, said mechanisms including notching devices for operating upon the edge of a blank, means transferring the can body blank past said notching mechanism and past also other operating stations, and detectors arranged on opposite sides of the notching mechanism, the detector in front thereof determining the excessive thickness of the blank and the detector behind said notching mechanism detecting malformation in the blank as a result of the notching operation.

4. In a machine for making can bodies, the combination of a plurality of successively operating mechanisms to which a sheet of tin plate is successively presented for operation thereupon to ultimately produce a formed can body, and a forming horn, said mechanisms including devices for arranging the body in cylindrical form about said forming horn, and detector mechanisms arranged on opposite sides of said forming station for determining the excessive thickness and malformation of a can body both before and after the forming operation.

5. In a machine for making can bodies, the combination of a plurality of successively operating mechanisms to which a sheet of tin plate is successively presented for operation thereupon to ultimately produce a formed can body, and a forming horn, said mechanisms including devices for arranging the body in cylindrical form about said forming horn, and a detector mechanism arranged immediately in advance of said forming station to detect malformation in the sheet supplied to said forming station for the forming of the body.

6. In a machine for making can bodies, the combination of a forming horn and a plurality of successively operating mechanisms to which a sheet of tin plate is successively presented for operation thereupon to ultimately produce a formed can body, said mechanisms including devices for arranging the body in cylindrical form about said forming horn, and a detector arranged immediately behind and associated with said forming station to detect malformation of the can body in the forming operation.

7. In a machine for making can bodies, the combination of a forming horn and a plurality of successively operating mechanisms to which a sheet of tin plate is successively presented for operation thereupon to ultimately produce a formed can body, said mechanisms including devices for arranging the body in cylindrical form about said forming horn, and a detector arranged at the forming station for determining malformation of the sheet as it is given the can body form.

8. In a machine for making can bodies, the combination of a plurality of successively operating mechanisms to which a sheet of tin plate is successively presented for operation thereupon to ultimately produce a formed can body, said mechanism including a device for forming the edges of a can body blank into hooks adapted subsequently to be interengaged for presentation into locked relation, and detector mechanisms arranged in advance and behind said hook forming devices to determine malformation of said blank.

9. In a machine for making can bodies, the combination of a plurality of successively operating mechanisms to which a sheet of tin plate is successively presented for operation thereupon to ultimately produce a formed can body, said mechanism including a device for forming the edges of a can body blank into hooks adapted subsequently to be interengaged for presentation into locked relation, and a detector mechanism located closely adjacent to and in advance of said hook forming mechanism to determine malformation of a blank about to be presented to said hook forming mechanism.

10. In a machine for making can bodies, the combination of a plurality of successively operating mechanisms to which a sheet of tin plate is successively presented for operation thereupon to ultimately produce a formed can body, said mechanism including a device for forming the edges of a can body blank into hooks adapted subsequently to be interengaged for presentation into locked relation, and a detector associated with said hook forming mechanism to determine malformation of the blank as a result of said hook forming operation.

11. In a machine for making can bodies, the combination of a forming horn and a plurality of successively operating mechanisms to which a sheet of tin plate is successively presented for operation thereupon to ultimately produce a formed can body, said mechanisms including a bumping station and devices thereat arranged to interengage the edges of the blank and compress the same into interlocked relation, and a detector mechanism arranged before and behind said bumping station to detect malformation of the blank both before and after the bumping operation.

12. In a machine for making can bodies, the combination of a forming horn and a plurality of successively operating mechanisms to which a sheet of tin plate is successively presented for operation thereupon to ultimately produce a formed can body, said mechanisms including a bumping station and devices thereat arranged to interengage the edges of the blank and compress the same into interlocked relation, and a detector mechanism arranged adjacent to and in advance of the bumping station for detecting malformation of the blank prior to the bumping action.

13. In a machine for making can bodies, the combination of a forming horn and a plurality of successively operating mechanisms to which a sheet of tin plate is successively presented for operation thereupon to ultimately produce a formed can body, said mechanisms including a bumping station and devices thereat arranged to interengage the edges of the blank and compress the same into interlocked relation, and a detector mechanism associated with said bumping station for detecting malformation of the blank as a result of said bumping action.

14. In a machine for making can bodies, the combination of associated mechanisms operating in timed relation to perform successive operations on a can body blank, converting it from flat sheet formation into a formed body with its edges interengaged and secured together, and a detector mechanism for determining malformation of the blank and excessive thickness thereof, said detector mechanism automatically operating to stop further action of the machine upon presentation of a blank malformed or of excessive thickness, and manual means for operating said detector mechanism to cause interruption of the operation of said machine.

15. In a machine for making can bodies, the combination of associated mechanisms operating in timed relation to perform successive operations on a can body blank, converting it from flat sheet formation into a formed body with its edges interengaged and secured together, a detector mechanism arranged at intervals in said machine and automatically operating to stop said machine upon presentation of a blank of excessive thickness or a blank of malformation, and manual operable means associated with each said detector for manually stopping the machine by the detector mechanisms.

16. In a machine for making can bodies by directing a flat body blank about a forming horn and as an incident thereto bending the blank to desired configuration, the combination of a forming horn, feeding devices directing the blank about said horn, and a detector mechanism arranged at said horn for stopping action of the machine upon presentation to the horn of a blank of excesssive thickness or of malformation.

17. In a machine for making can bodies, the combination of a forming horn along which can body blanks are adapted to be progressively advanced to present the same to successive forming stations, forming mechanisms arranged at said stations, and outside confining means holding the blank to the horn as it is advanced therealong, said confining means being provided at intervals with movable units yieldably pressing the blank to the horn.

18. In a machine for making can bodies, the combination of a forming horn along which can body blanks are adapted to be progressively advanced to present the same to successive forming stations, forming mechanisms arranged at said stations, and bars arranged outside said horn and holding said blanks thereto, said bars being provided at intervals with movable sections yieldingly held to the horn to compress the successive blanks thereabout.

19. In a machine for making can bodies, the combination of a forming horn along which can body blanks are adapted to be progressively advanced to present the same to successive forming stations, forming mechanisms arranged at said stations, guide bars arranged outside said horn for holding the blank thereto, said bars having parts yieldingly held in place and adapted for manual release, and detector mechanisms associated with said bars for stopping the machine upon existence of an adverse operating condition.

20. In a machine for making can bodies, the combination of a forming horn, means for arranging a blank about said horn and bent to conform to the configuration thereof, means feeding the bent blank along the horn and past stations and mechanisms thereat by which operations are performed upon the blank, a clamping device arranged at an operating station and comprising shaped members clamping the blank to the horn, and a slide moving transversely of the horn and moving said members into and out of clamping relation.

21. In a machine for making can bodies, the combination of a horn about which can bodies are adapted to be arranged and bent to conform to the shape of the horn, feeding mechanism for moving said blanks along the horn and past an edging station, edging devices arranged at said station, clamping members disposed at opposite sides of the horn and for pressing the blank to the horn at said station, and a slide movable transversely of the horn for bringing said clamping members into and out of clamping position.

22. In a machine for making can bodies, the combination of a horn about which can bodies are adapted to be arranged and bent to conform to the shape of the horn, feeding mechanism for moving said blanks along the horn and past an edging station, edging devices arranged at said station, clamping members disposed at opposite sides of the horn and for pressing the blank to the horn at said station, and a slide movable transversely of the horn for bringing said clamping members into and out of clamping position, said slide being reciprocated in timed relation to said feeding mechanisms.

23. In a machine for making can bodies, the combination of a horn, means for arranging a horn extending past a bumping station having bumping means, means for arranging a can body blank about said horn and presenting it to said bumping station with its edges bent to hooked formation, clamping devices at said bumping station adapted to press the blank to the horn at opposite sides of said horn, and links supporting said clamping devices dimensioned and arranged to provide right line motion thereto into and out of clamping position.

24. In a machine for making can bodies, the combination of a horn, means for arranging a horn extending past a bumping station having bumping means, means for arranging a can body blank about said horn and presenting it to said bumping station with its edges bent to hooked formation, clamping devices at said bumping station adapted to press the blank to the horn at opposite sides of said horn, and links supporting said clamping devices dimensioned and arranged to provide right line motion thereto into and out of clamping position and having means operating said links and said clamping devices in timed relation to other parts of said machine.

JOHN F. PETERS.